United States Patent
Lin et al.

(10) Patent No.: US 11,503,300 B2
(45) Date of Patent: Nov. 15, 2022

(54) METHOD AND APPARATUS OF AFFINE MODE MOTION-VECTOR PREDICTION DERIVATION FOR VIDEO CODING SYSTEM

(71) Applicant: MEDIATEK INC., Hsinchu (TW)

(72) Inventors: Zhi-Yi Lin, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 11 days.

(21) Appl. No.: 17/057,349

(22) PCT Filed: May 24, 2019

(86) PCT No.: PCT/CN2019/088371
§ 371 (c)(1),
(2) Date: Nov. 20, 2020

(87) PCT Pub. No.: WO2019/223790
PCT Pub. Date: Nov. 28, 2019

(65) Prior Publication Data
US 2021/0203943 A1 Jul. 1, 2021

Related U.S. Application Data

(60) Provisional application No. 62/732,017, filed on Sep. 17, 2018, provisional application No. 62/723,526,
(Continued)

(51) Int. Cl.
*H04N 7/12* (2006.01)
*H04N 19/137* (2014.01)
(Continued)

(52) U.S. Cl.
CPC ......... *H04N 19/137* (2014.11); *G06T 3/0006* (2013.01); *H04N 19/105* (2014.11); *H04N 19/159* (2014.11); *H04N 19/176* (2014.11)

(58) Field of Classification Search
CPC ............................. H04N 19/52; G06T 3/0006
See application file for complete search history.

(56) References Cited

FOREIGN PATENT DOCUMENTS

| WO | 2016/008408 A1 | 1/2016 |
|---|---|---|
| WO | 2017/118411 A1 | 7/2017 |

(Continued)

OTHER PUBLICATIONS

International Search Report and Written Opinion dated Aug. 13, 2019, issued in application No. PCT/CN2019/088371.
(Continued)

*Primary Examiner* — Y Lee
(74) *Attorney, Agent, or Firm* — McClure, Qualey & Rodack, LLP

(57) ABSTRACT

Method and apparatus for coding system using affine motion model are disclosed. According to one method, a neighbouring block set of the current block comprising multiple spatial neighbouring blocks and one or more collocated blocks is determined for the current block. One or more constructed affine MVP candidates are derived for an affine MVP candidate list based on CP (control-point) MVs (motion vectors) at multiple spatial neighbouring blocks and said one or more collocated blocks. One constructed affine MVP candidate without one temporal MV is checked and inserted into the affine MVP candidate list before any constructed affine MV with one temporal MV. The current block or motion information of the current block is then encoded or decoded based on the affine MVP candidate list.

10 Claims, 8 Drawing Sheets

Related U.S. Application Data filed on Aug. 28, 2018, provisional application No. 62/679,799, filed on Jun. 2, 2018, provisional application No. 62/676,336, filed on May 25, 2018.

(51) Int. Cl.
  *H04N 19/105*  (2014.01)
  *H04N 19/159*  (2014.01)
  *H04N 19/176*  (2014.01)
  *G06T 3/00*  (2006.01)

(56) References Cited

FOREIGN PATENT DOCUMENTS

| WO | 2017/157259 A1 | 9/2017 |
|---|---|---|
| WO | 2018/061563 A1 | 4/2018 |
| WO | 2018/067823 A1 | 4/2018 |
| WO | 2018/126163 A1 | 7/2018 |

OTHER PUBLICATIONS

Chen, et al.; "Algorithm description of Joint Exploration Test Model 3;" International Organization for Standardization Organisation Internationale De Normalisation ISO/IEC JTC 1/SC 29/WG 11 Coding of Moving Pictures and Audio; Jun. 2016; pp. 1-37.

Han, Y. et al., "CE4.1.3: Affine motion compensation prediction;" Joint Video Exploration Team (JVET) of ITU-T SG 16 WP 3 and ISO/IEC JTC 1/SC 29/WG 11; Jul. 2018; pp. 1-46.

Yang, H., et al.; "Description of CE4: Inter prediction and motion vector coding;" Joint Video Experts Team (JVET)of ITU-T SG 16 WP 3 and ISO/IEC JTC 1/SC 29/WG 11; Apr. 2018; pp. 1-46.

International Search Report and Written Opinion dated Nov. 13, 2019, issued in application No. PCT/CN2019/101519.

Chinese language office action dated Feb. 6, 2020, issued in application No. TW 108118182.

Chinese language office action dated Nov. 9, 2020, issued in application No. TW 108129548.

Chinese language office action dated Dec. 22, 2021, issued in application No. CN 201980053534.1.

Shinobu, K., et al.; "Motion vector prediction methods considering prediction continuity in HEVC;" IEEE; Dec. 2016; pp. 1-5.

Partial supplementary European Search Report dated May 17, 2022, issued in application No. EP 19807349.6.

Bordes, P., et al.; "Description of SDR, HDR and 360° video coding technology proposal by Qualcomm and Technicolor—medium complexity version;" Joint Video Experts Team (JVET) of ITU-T SG 16 WP 3 and ISO/IEC JTC 1/SC 29/WG 11; Apr. 2018; pp. 1-85.

Chen, Y., et al.; "Description of SDR, HDR and 360° video coding technology proposal by Qualcomm and Technicolor—low and high complexity versions;" Joint Video Exploration Team (JVET) of ITU-T SG 16 WP 3 and ISO/IEC JTC 1/SC 29/WG 11; Apr. 2018; pp. 1-42.

METHOD AND APPARATUS OF AFFINE MODE MOTION-VECTOR PREDICTION DERIVATION FOR VIDEO CODING SYSTEM

CROSS REFERENCE TO RELATED APPLICATIONS

The present invention claims priority to U.S. Provisional Patent Application Ser. No. 62/676,336, filed on May 25, 2018, U.S. Provisional Patent Application Ser. No. 62/679,799, filed on Jun. 2, 2018, U.S. Provisional Patent Application Ser. No. 62/723,526, filed on Aug. 28, 2018 and U.S. Provisional Patent Application Ser. No. 62/732,017, filed on Sep. 17, 2018. The U.S. Provisional Patent Applications are hereby incorporated by reference in their entireties.

FIELD OF THE INVENTION

The present invention relates to video coding using motion estimation and motion compensation. In particular, the present invention relates to generating an affine MVP (motion vector prediction) candidate list including one or more affine MVP candidates associated with one or more blocks coded using the affine mode.

BACKGROUND AND RELATED ART

Various video coding standards have been developed over the past two decades. In newer coding standards, more powerful coding tools are used to improve the coding efficiency. High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In most coding standards, adaptive Inter/Intra prediction is used on a block basis. In the Inter prediction mode, one or two motion vectors are determined for each block to select one reference block (i.e., uni-prediction) or two reference blocks (i.e., bi-prediction). The motion vector or motion vectors are determined and coded for each individual block. In HEVC, Inter motion compensation is supported in two different ways: explicit signalling or implicit signalling. In explicit signalling, the motion vector for a block (i.e., PU) is signalled using a predictive coding method. The motion vector predictors correspond to motion vectors associated with spatial and temporal neighbours of the current block. After a MV predictor is determined, the motion vector difference (MVD) is coded and transmitted. This mode is also referred as AMVP (advanced motion vector prediction) mode. In implicit signalling, one predictor from a candidate predictor set is selected as the motion vector for the current block (i.e., PU). Since both the encoder and decoder will derive the candidate set and select the final motion vector in the same way, there is no need to signal the MV or MVD in the implicit mode. This mode is also referred as Merge mode. The forming of predictor set in Merge mode is also referred as Merge candidate list construction. An index, called Merge index, is signalled to indicate the predictor selected as the MV for current block.

Motion occurs across pictures along temporal axis can be described by a number of different models. Assuming $A(x, y)$ be the original pixel at location $(x, y)$ under consideration, $A'(x', y)$ be the corresponding pixel at location $(x', y)$ in a reference picture for a current pixel $A(x, y)$, the affine motion models are described as follows.

The affine model is capable of describing two-dimensional block rotations as well as two-dimensional deformations to transform a square (or rectangles) into a parallelogram. This model can be described as follows:

$$x'=a_0+a_1*x+a_2*y, \text{ and}$$

$$y'=b_0+b_1*x+b_2*y. \tag{1}$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \Delta \Rightarrow \begin{cases} vx = (1-a)x - by - e \\ vx = (1-a)y + bx - f \end{cases} \tag{2}$$

An example of the four-parameter affine model is shown in FIG. 1A, where block 110 corresponds to the current block. The transformed block is a rectangular block. The four-parameter affine model can handle object rotation as shown in FIG. 1B, where the rectangle 110 is rotated to rectangle 120. The location of the rotated rectangle 120 can be specified by the motion vectors (i.e., $\vec{v_0}$ and $\vec{v_1}$) at two control points. The four-parameter affine model can also handle object rotation with size scaling as shown in FIG. 1C, where the rectangle 110 is rotated to rectangle 130 with a scaling factor p. Again, the location of the rotated rectangle 120 can be specified by the motion vectors (i.e., $\vec{v_0}$ and $\vec{v_1}$) at two control points.

The motion vector field of each point in this moving block can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \tag{3}$$

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block.

A six-parameter affine model has disclosed in JVET-K0337 (Han et al., "CE4.1.3: Affine motion compensation prediction", Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET- K0337) for the affine Merge mode and affine Inter mode. The six-parameter affine model uses 3 control points ($\vec{v}_0$, $\vec{v}_1$ and $\vec{v}_2$) as shown in FIG. 2A, where block 210 corresponds to a current PU. The six-parameter affine motion model is capable of transforming a rectangle 220 into a parallelogram 230 as shown in FIG. 2B. When an affine motion block is moving, the motion vector field of the block can be described by three control point motion vectors or four parameters as follows, where (vx, vy) represents the motion vector $$\begin{cases} x' = ax + by + e \\ y' = cx + dy + f \\ vx = x - x' \\ vy = y - y' \end{cases} \quad (4)$$

When the MVs ($v_0$ and $v_1$) of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. An example of motion vectors for a current block can be determined for each 4×4 sub-block based on the MVs of the two control points as shown in FIG. 3 according to equation (3).

When the MVs ($v_0$, $v_1$ and $v_2$) of three control points are decoded, the MV of each 4×4 block can be derived according to the following equation:

$$\begin{cases} v_x = \frac{(v_{1x} - v_{0x})}{w}x + \frac{(v_{2y} - v_{0y})}{h}y + v_{0x} \\ v_y = \frac{(v_{1y} - v_{0y})}{w}x + \frac{(v_{2x} - v_{0x})}{h}y + v_{0y} \end{cases} \quad (5)$$

An example of motion vectors for a current block can be determined for each 4×4 sub-block based on the MVs of the three control points as shown in FIG. 3 according to equation (5). The MV of the centre pixel (i.e., position at (2, 2) of a 4×4 block) represents the MV of the 4×4 block. The MV precision is clipped to 1/16-pel precision.

The affine motion model for deriving Merge candidate list in Merge mode coding has been shown to be a useful coding tool to handle more complex motion within the video sequence. It is desirable to develop affine motion techniques to further improve the system coding performance. Accordingly, various affine based motion vector prediction techniques have been disclosed in the present invention.

BRIEF SUMMARY OF THE INVENTION

According to one method, a neighbouring block set of the current block comprising multiple spatial neighbouring blocks and one or more collocated blocks is determined, where one MV (motion vector) associated with one collocated block is referred as one temporal MV. One or more constructed affine MVP candidates are derived for an affine MVP candidate list based on CP (control-point) MVs (motion vectors) at said multiple spatial neighbouring blocks and said one or more collocated blocks, where one constructed affine MVP candidate without one temporal MV is checked and inserted into the affine MVP candidate list before any constructed affine MV with one temporal MV. The current block or motion information of the current block is encoded or decoded based on the affine MVP candidate list.

In one embodiment, one or more first constructed affine MVP candidates associated with a 6-parameter affine model are checked before one or more second constructed affine MVP candidates associated with a 4-parameter affine model. In another embodiment, one or more first constructed affine MVP candidates associated with a 6-parameter affine model containing one or more MVs derived from the MVs in top-left, top-right, and bottom-left positions are checked before one or more second constructed affine MVP candidates associated with a 6-parameter affine model containing one or more MVs not derived from the MVs in the top-left, top-right, and bottom-left positions.

In one embodiment, one or more first constructed affine MVP candidates associated with a 4-parameter affine model containing one or more MVs derived from the MVs in top-left and top-right positions are checked before one or more second constructed affine MVP candidates associated with a 4-parameter affine model containing one or more MVs not derived from the MVs in the top-left and top-right positions. In another embodiment, said one or more constructed affine MVP candidates are derived according to an order corresponding to {TL, TR, BL}→{TL, TR, Col}→{TL, BL, Col}→{TR, BL, Col}→{TL, TR}→{TL, BL}, wherein TL corresponds to a top-left MV, TR corresponds to a he top-right MV, BL corresponds to a bottom-left MV and Col corresponds to one temporal MV.

According to this method, for a 4-parameter affine model, said one or more constructed affine MVPs are checked and inserted according to a predefined order corresponding to (CP0_B2, CP1_B1)→(CP0_B2, CP1_B0)→(CP0_B2, CP2_A1)→(CP0_B2, CP2_A0)→(CP2_A1, CP3_RB)→(CP2_A0, CP3_RB)→(CP3_RB, CP1_B1)→(CP3_RB, CP1_B0) if no MV associated with CP0, CP1 and CP2 is one temporal MV, and where CPi_XX corresponds to one MV associated with control point i at location XX, i is equal to 0, 1, 2 or 3, and XX corresponds to A0 (left-bottom block), A1 (left block), B0 (above-right block), B1 (above block), B2 (above-left corner block), or RB (collocated right-bottom block). For a 6-parameter affine model, said one or more constructed affine MVPs are checked and inserted according to a predefined order corresponding to (CP0_B2, CP1_B1, CP2_A1)→(CP0_B2, CP1_B1, CP2_A0)→(CP0_B2, CP1_B0, CP2_A1)→(CP0_B2, CP1_B0, CP2_A0)→(CP0_B2, CP1_B1, CP3_RB)→(CP0_B2, CP1_B0, CP3_RB) if no MV associated with CP0, CP1 and CP2 is one temporal MV.

Candidate list padding can be applied. If the affine MVP candidate list is not full after all derived affine MVP candidates are derived and inserted, one or more zero-MV MVP candidates can be added to the affine MVP candidate list.

Candidate list pruning can be applied. In one embodiment, one to-be-added inherited affine MVP candidate can be compared to one or more affine MVP candidates in the affine MVP candidate list and said one to-be-added inherited affine MVP candidate is not inserted to the affine MVP candidate list if said one to-be-added inherited affine MVP candidate is redundant. In another embodiment, one to-be-added inherited affine MVP candidate can be compared to a first affine MVP candidate or a last affine MVP candidate in the affine MVP candidate list, and said one to-be-added inherited affine MVP candidate is not inserted to the affine MVP candidate list if said one to-be-added inherited affine MVP candidate is redundant.

According to another method, a neighbouring block set for the current block is determined for a two-CP (control point) affine model or a three-CP affine model, wherein the neighbouring block set comprises spatial neighbouring blocks around a top-left corner and a top-right corner of the current block for the two-CP affine model or the neighbouring block set comprises the spatial neighbouring blocks around the top-left corner, the top-right corner and a bottom-left corner of the current block for the three-CP affine model. One or more constructed affine MVP candidates are derived based on a first CP MV firstly available from one spatial neighbouring block around the top-left corner and a second CP MV firstly available from one spatial neighbouring block around the top-right corner for the two-CP affine mode, or one or more constructed affine MVP candidates are derived based on the first CP MV, the second CP MV, and a third CP MV firstly available from one spatial neighbouring block around the bottom-left corner for the three-CP affine mode. An affine MVP candidate list is then generated, wherein the affine MVP candidate list comprises said one or more constructed affine MVP candidates for the two-CP affine model if the first CP MV and the second CP MV exist, or the affine MVP candidate list comprises said one or more constructed affine MVP candidates for the three-CP affine model if the first CP MV, the second CP MV and the third CP MV exist. Prediction differences of a current control-point MV set associated with the two-CP affine motion model or the three-CP affine motion model is encoded using one predictor selected from the affine MVP candidate list at the video encoder side or the prediction differences of the current control-point MV set associated with the two-CP affine motion model or the three-CP affine motion model is decoded at the video decoder side using one predictor selected from the affine MVP candidate list.

In one embodiment, the spatial neighbouring blocks around the top-left corner of the current block include an above-left corner block (a0), an above-left block (a1), and a left-top block (a2), the spatial neighbouring blocks around the top-right corner of the current block include an above block (b0) and an above-right block (b1), and the spatial neighbouring blocks around the bottom-left corner of the current block include a left block (c0) and a left-bottom block (c1), the spatial neighbouring blocks are checked according to a0→a1→a2 for the top-left corner of the current block, b0→b1 for the top-right corner of the current block and c0→c1 for the bottom-left corner of the current block. A first candidate can be selected as the first CP MV according to a0→a1→a2 order and according to current reference list→other reference list order for each location if the first candidate points to a same target reference picture as the current block; a second candidate can be selected as the second CP MV according to b0→b1 order and according to the current reference list→the other reference list order for each location if the second candidate points to the same target reference picture as the current block; and a third candidate can be selected as the third CP MV according to c0→c1 order and according to the current reference list→the other reference list order for each location if the third candidate points to the same target reference picture as the current block.

In one embodiment, if the affine MVP candidate list is not full after all derived affine MVP candidates are inserted, one or more zero-MV MVP candidates are added to the affine MVP candidate list. In another embodiment, one to-be-added constructed affine MVP candidate is compared to one or more affine MVP candidates in the affine MVP candidate list and said one to-be-added constructed affine MVP candidate is not inserted to the affine MVP candidate list if said one to-be-added constructed affine MVP candidate is redundant.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the present invention, various methods of utilizing affine motion estimation and compensation for video compression are disclosed. In particular, the affine motion estimation or compensation is used for coding video data in a Merge mode or an Inter prediction mode.

In VTM-3.0 (J. Chen, et al., "Test Model 3 of Versatile Video Coding (VTM 3)", in Joint Video Exploration Team (JVET) of ITU-T SG 16 WP 3 and ISO/IEC JTC 1/SC 29/WG 11, 12th Meeting: Macao, Conn., 3-12 Oct. 2018, Document: JVET-L1002), the affine Inter mode with 4/6-parameter affine model switching and affine Merge mode are adopted. In affine Inter mode, one parameter flag is signalled to indicate to use 4- or 6-parameter affine model. If 4-parameter affine model is used, 1 MVP (motion vector predictor) pair and 2 MVDs (motion vector differences) are signalled. If 6-parameter affine model is used, 1 MVP set (with 3 MVPs) and 3 MVDs are signalled.

Figure 1A:
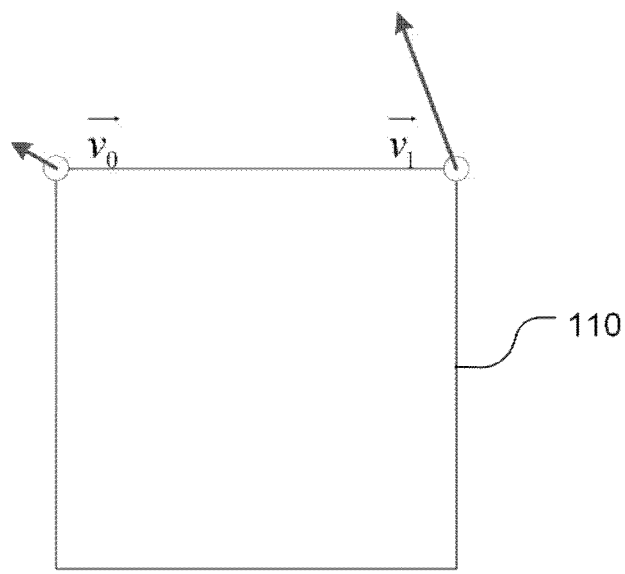
FIG. 1A illustrates an example of the four-parameter affine model, where the affine model is specified according to two control-point motion vectors.
Figure 1B:
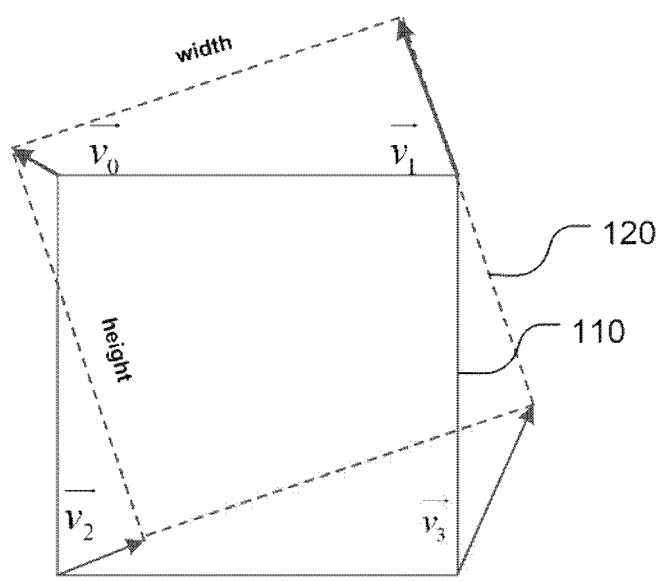
FIG. 1B illustrates an example of the four-parameter affine model, where the transformed block is rotated based on the MVs of the two control points.
Figure 1C:
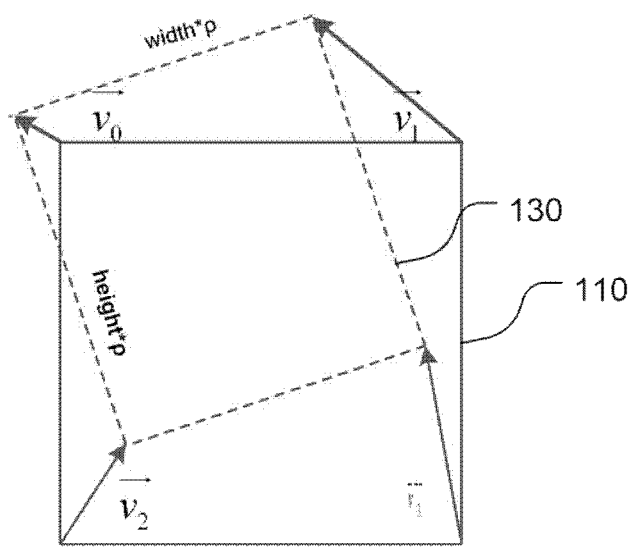
FIG. 1C illustrates an example of the four-parameter affine model, where the transformed block is rotated and scaled based on the MVs of the two control points.
Figure 2A:
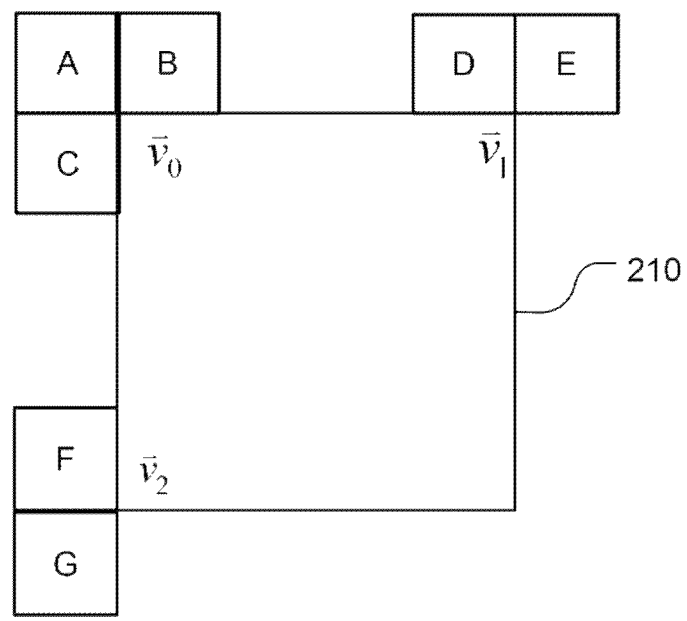
FIG. 2A illustrates an example of 3 control-point MVs (i.e., $\vec{v}_0$, $\vec{v}_1$ and $\vec{v}_2$) for the six-parameter affine model.
Figure 2B:
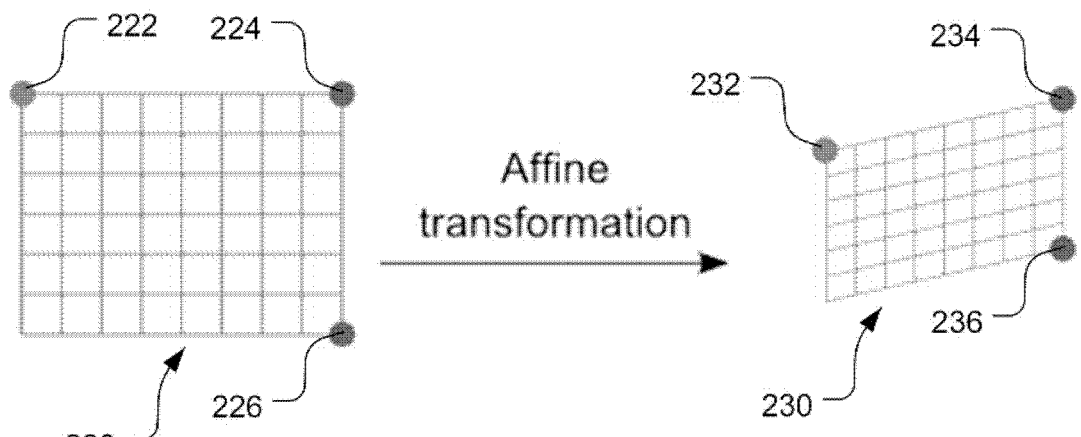
FIG. 2B illustrates an example of a six-parameter affine motion model that is capable of transforming a rectangle into a parallelogram.
Figure 3:
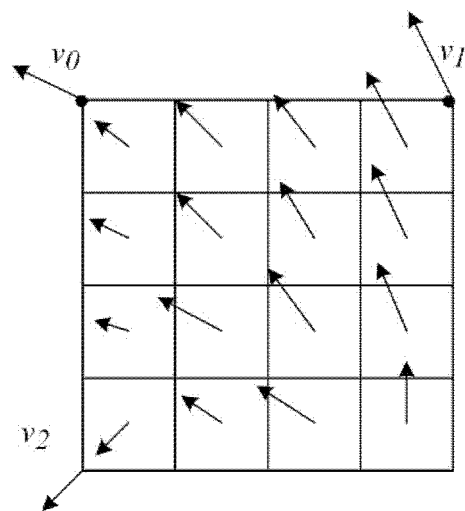
FIG. 3 illustrates an example of motion vectors for a current block determined for each 4×4 sub-block based on the MVs of the two control points.
Figure 4A:
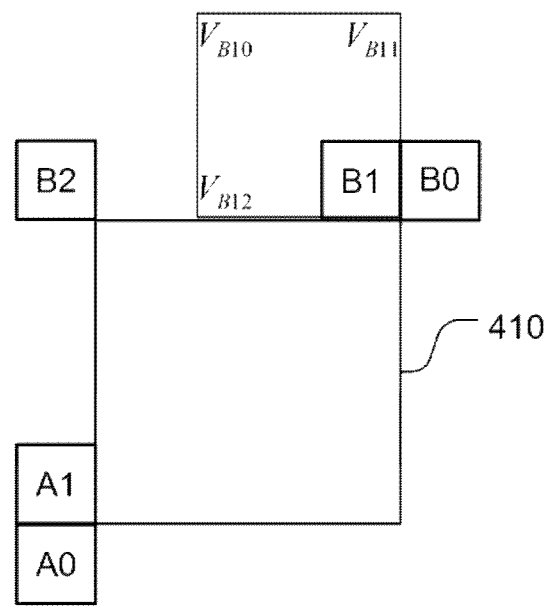
FIG. 4A illustrates an example of neighbouring blocks (A0, A1, B0, B1 and B2) of the current block, where the control-point MVs (i.e., $V_{B10}$, $V_{B11}$ and $V_{B12}$) for block B1 are shown.
Figure 4B:
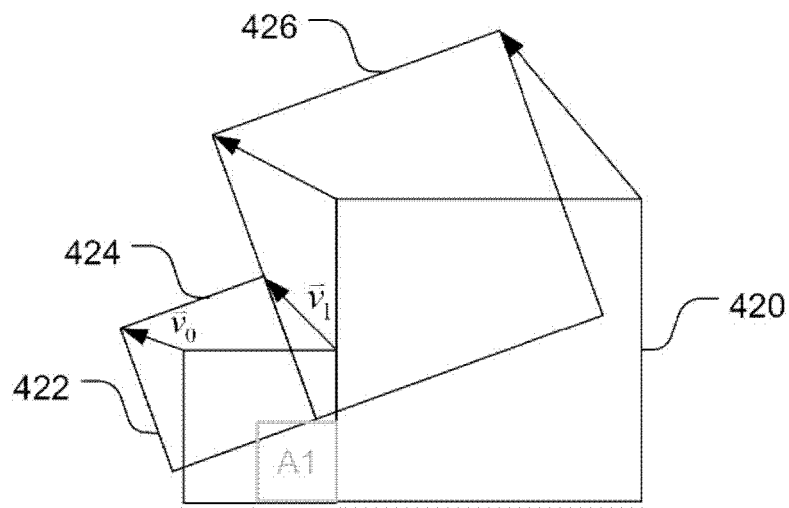
FIG. 4B illustrates an example of inheriting the affine motion from block A1, where the control-point MVs of block A1 are used as the control-point MVs of the current block.
Figure 4C:
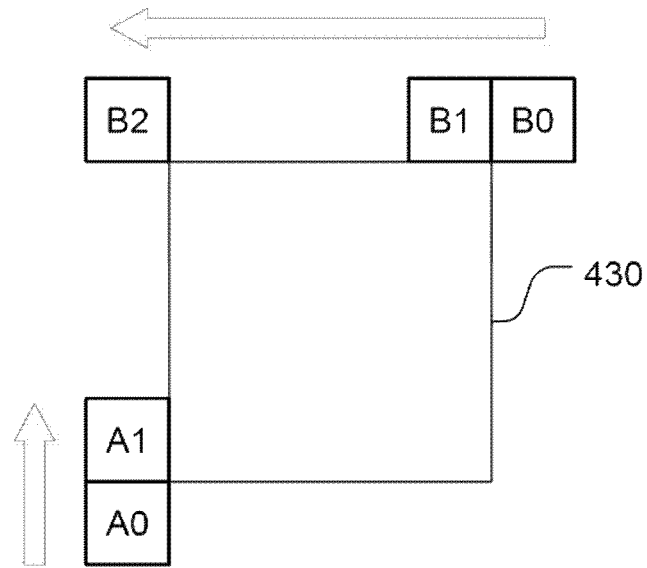
FIG. 4C illustrates the order to select a candidate for inheriting the control-point MVs according to: (A0→A1) (B0→B1→B2).

There are two kinds of affine candidate: Inherited affine candidate and Corner derived candidate (i.e., constructed candidate). For the inherited affine candidate, the current block inherits the affine model of neighbouring block. The control point MVs are from the same neighbouring block. For example, FIG. 4A illustrates an example of neighbouring blocks (A0, A1, B0, B1 and B2) of the current block 410, B1 corresponds to the above block, B0 corresponds to the above-right block, B2 corresponds to the above-left corner block, A1 corresponds to the left block and A0 corresponds to the left-bottom block. The control-point MVs (i.e., $V_{B10}$, $V_{B11}$ and $V_{B12}$) for block B1 are shown. If the current block 410 inherits the affine motion from block A1, the control-point MVs of block A1 are used as the control-point MVs of the current block as shown in FIG. 4B, where the block 422 associated with block A1 is rotated to block 424 based on the two control-point MVs ($v_0$ and $v_1$). Accordingly, the current block 410 is rotated to block 426. The inherited candidates are inserted before the corner derived candidates. The order to select a candidate for inheriting the control-point MVs is according to: (A0→A1) (B0→B1→B2) as shown in FIG. 4C.

Figure 5:
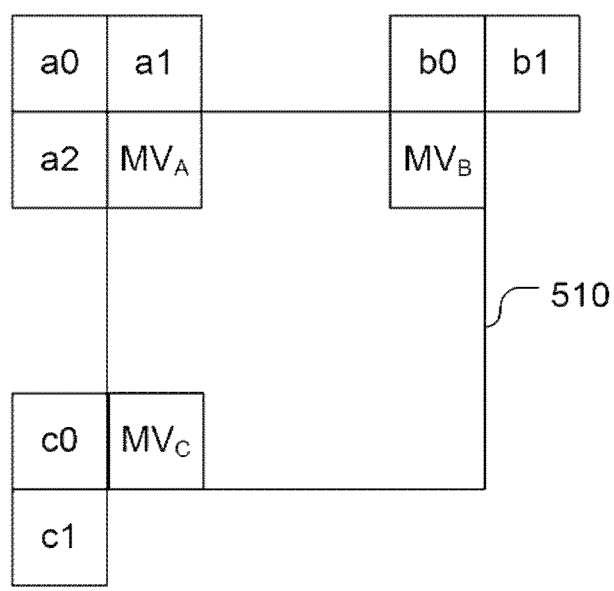
FIG. 5 illustrates an example of corner-derived candidate (i.e., constructed candidate), where the control point MVs are derived from different neighbouring blocks.

For corner derived candidate (constructed candidate), the control point MVs are derived from different neighbouring blocks as shown in FIG. 5, where block 510 corresponds to a current block. The process searches the first available MV in {a0, a1, a2} (named group A), the first available MV in {b0, b1} (named group B), and the first available MV in {c0, c1} (named group C). The process finds the MV in both lists l0 and l1 that points to the same target reference picture. For example, the process may search {b0-L0, b0-L1, b1-L0, b1-L1}, where b0-L0 corresponds to an MV in b0 pointing to a reference picture in l0 and b0-L1 corresponds to an MV in b0 pointing to a reference picture in l1, and so on. For 4 parameter affine mode, the motion vectors {$MV_A$, $MV_B$} are used. For 6-parameter affine mode, the motion vectors {$MV_A$, $MV_B$, $MV_C$} are used.

In ITU-T13-SG16-C-1016, the neighbouring MVs are used to form the MVP pair. In the current invention, it is proposed to use the affine information, {a, b, e, f} in equation (2), from the neighbouring block coded by the affine mode to generate the MVP pair (named neighbouring inherited affine MVP pair in this disclosure). For example, if the neighbouring block C1 is coded by the affine mode, then the affine information of neighbouring block C1 is used to derive one MV pair as the MVP pair when the current block is coded by the affine mode. Based on equation (3), ($v_{0x}$, $v_{0y}$) and ($v_{1x}$, $v_{1y}$) of current block can be derived in the following equation:

$$\begin{cases} v_{0x} = e \\ v_{0y} = f \end{cases} \quad (6)$$

and $$\begin{cases} v_{1x} = aW_{cur} - bH_{cur} + e \\ v_{1y} = -bW_{cur} - aH_{cur} + f \end{cases}.$$

In the above equation, where {a, b, e, f} are affine parameters used in neighbouring block C1.

In another embodiment, one of the MVs of the two control points MVPs of the spatial inherited affine candidate is be derived by following equation:

$$V_{0x}=V_{B0x}+(V_{B2\_x}-V_{B0x})*(\text{posCurCU\_Y-posRefCU\_Y})/\text{RefCU\_height}+(V_{B1x}-V_{B0x})*(\text{posCurCU\_X-posRefCU\_X})/\text{RefCU\_width} \quad (7)$$

$$V_{0y}=V_{B0y}+(V_{B2\_y}-V_{B0y})*(\text{posCurCU\_Y-posRefCU\_Y})/\text{RefCU\_height}+(V_{B1y}-V_{B0y})*(\text{posCurCU\_X-posRefCU\_X})/\text{RefCU\_width} \quad (8)$$

In the above equations, $V_{B0}$, $V_{B1}$, and $V_{B2}$ can be replaced by the top-left MV, top-right MV, and bottom-left MV of any reference/neighbouring CU, (posCurCU_X, posCurCU_Y) are the pixel position of the top-left sample of the current CU relative to the top-left sample of the picture, (posRefCU_X, posRefCU_Y) are the pixel position of the top-left sample of the reference/neighbouring CU relative to the top-left sample of the picture.

The other MV of the two control point MVPs of the spatial inherited affine candidate is be derived by following equation:

$$V_{1x}=V_{0x}+(V_{B1x}-V_{B0x})*\text{CU\_width}/\text{RefCU\_width} \quad (9)$$

$$V_{1y}=V_{0y}+(V_{B1y}-V_{B0y})*\text{CU\_width}/\text{RefCU\_width} \quad (10)$$

The insertion order can be predefined. For example, the neighbouring inherited affine MVP pair can be inserted as the order of "A1→B1→B0→A0→B2". Under the predefined order, the neighbouring inherit affine MVP pair can be inserted. In one example, if one of the neighbouring blocks is an affine coded block and one of the reference lists of the block points to the current target reference picture, the affine MVP pair is derived and inserted into the candidate list. In another example, if one of the neighbouring blocks is affine coded block and the same reference list of the current target reference list of the block points to the current target reference picture, the affine MVP pair is derived and inserted into the candidate list.

In yet another example, if one of the neighbouring blocks is affine coded block and the other reference list of the current target reference list of the block points to the current target reference picture, the affine MVP pair is derived and inserted into the candidate list. After the above process, if the candidate list is not full, the scaled affine MVP pair can be added. The scaled control point MVs can be used as the neighbouring inherited affine MVP pair. For example, the available control point MVs are scaled to the target reference picture as one of the MVP candidates. The order of the reference list control point MVs that should be scaled first can be predefined or derived. For example, the same reference list is checked first, or is checked later. In one embodiment, if an affine coded block is already used for generating an MVP pair, it can be skipped in the MVP pair generation process. For example, if an affine coded block is already used for generating an MVP pair without MV scaling, then it will not be used to generate the MVP pair with MV scaling. In another example, under a predefined block scan order, the non-scaled MVP pair and/or scaled MVP pair is inserted one by one. For example, the MVP pair can be inserted in the following order: the non-scaled MVP pair of A1, the scaled MVP pair of A1, the non-scaled MVP pair of B1, the scaled MVP pair of B1, and so on. Also, if the non-scaled MVP pair is taken, the scaled MVP pair can be skipped.

In another example, only affine coded blocks with the same reference picture of the current target reference picture will be used to derive the affine MVP pair.

In another example, the insertion order is different. As shown in FIG. 4C, it has two branches of processes. In the first branch, the left block are scanned first. It derives one affine MVP candidate pair from the left blocks (e.g. A0→A1, or A1→A0). The similar process mentioned above can be used. For example, if one of the neighbouring blocks is an affine coded block and the same reference list of the current target reference list of the block points to the current target reference picture, the affine MVP pair is derived and inserted into the candidate list. The first available one can be used. If none of them is available, the scaled MVP pair mentioned above can be used. For example, the available control point MVs are scaled to the target reference picture as one of the MVP candidate. In one embodiment, if an affine coded block is already used for generating an MVP pair without MV scaling, then the affine coded block will not be used to generate the MVP pair with MV scaling. In the second branch, the above blocks are scanned. It derives one affine MVP candidate pair from the above blocks, such as B0→B1→B2 or B2→B1→B0. The similar process of the first branch can be applied. In another example, under the predefined block scan order, the non-scaled MVP pair and/or scaled MVP pair is inserted one by one. For example, the MVP pair is inserted in the following order in first branch: the non-scaled MVP pair of A0, the scaled MVP pair of A0, the non-scaled MVP pair of A1, the scaled MVP pair of A1. Also, if the non-scaled MVP pair is taken, the scaled MVP pair can be skipped.

Note that, the pruning can be performed for the to-be-added affine MVP pair to avoid redundant. The pruning process can be a) checking whether all the control point MVs are the same as one of the MVP pair, b) checking whether MV difference of the control point MVs with one or more already-in-the-list affine MVP pair is smaller than a threshold.

Also, if the derived MVs of all the control points in a MVP pair are the same, which will act like the translational motion model, the derived MVP pair can be discarded or not inserted into the candidate list, or the priority of this kind of MVP pair is moved to low priority. For example, the derived MVP pair can be inserted into the list if there is no other candidates or the candidate list is not full.

The priority of this MVP pair can be higher than the original method. We can insert all MVP pairs generated by using affine information from neighbouring blocks into MVP pair list first, and followed by the original method. In another embodiment, this proposed method can be inter-leaved with the original method on MVP pair basis.

If the number of the MVP pairs is less than a predefined value (e.g. 2), the corner derived affine candidate can be used. The neighbouring motion vectors, as shown in FIG. 5, can be used to derive the affine MVP pair. For the first corner derived affine candidate, the first available MV in set A (i.e., a0 (above-left corner block), a1 (above-left block), and a2 (left-top block)) and first available MV in set B (i.e., b0 (above block) and b1 (above-right block)) are used to construct the first MVP pair. For the second corner derived affine candidate, the first available MV in set A and first available MV in set C (i.e., c0 (left block) and c1 (left-bottom block)) are used to calculate the MV of top-right control point. The first available MV in set A and the calculated top-right control point MV are the second MVP pair. Also, if the derived MVs of all the control points in an MVP pair are the same (i.e., a translational motion model), the derived MVP pair can be discarded or not inserted into the candidate list. In this case, the priority of this kind of MVP pair can be moved to low priority. For example, the MVP pair can be inserted into the list if there is no other candidates or the candidate list is not full.

If after adding the neighbouring inherited affine and corner affine MVP, the number of MVP is still less than the predefined value, the temporal affine candidate can be used.

Figure 6:
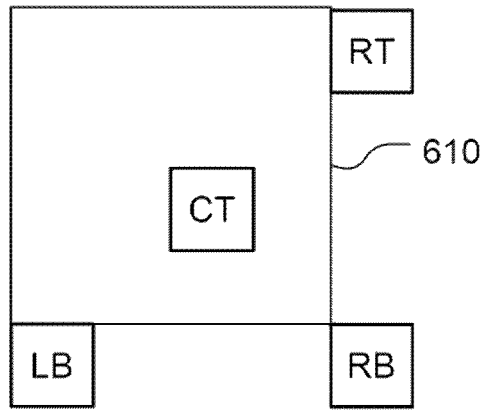
FIG. 6 illustrates an example of temporal affine candidate, where affine coded blocks in the neighbouring blocks of collocated block or the collocated block itself will be inserted in the order "RB→CT→LB→RT" for current block.

In temporal affine candidate, affine coded blocks in the neighbouring blocks of collocated block or the collocated block itself will be inserted in the order "RB→CT→LB→RT" as shown in FIG. 6 for current block 610, where RB refers to right-bottom block, CT refers to centre block, LB refers to left-bottom block and RT refers to right-top block. In one example, if one of the neighbouring blocks of the collocated block is an affine coded block and one of the reference lists of the block points to the current target reference picture, the affine MVP pair is derived and inserted into the candidate list. In another example, if one of the neighbouring blocks of the collocated block is affine coded block and the same reference list of the current target reference list of the block points to the current target reference picture, the affine MVP pair is derived and inserted into the candidate list. In yet another example, if one of the neighbouring blocks of the collocated block is an affine coded block and the other reference list of the current target reference list of the block points to the current target reference picture, the affine MVP pair is derived and inserted into the candidate list. If the affine coded block is collocated block itself, the affine MVP pair is inherited directly. In one example, if the collocated block is an affine coded block and one of the reference list of the block points to the current target reference picture, the affine MVP pair is inserted into the candidate list. In another example, if the collocated block is an affine coded block and the same reference list of the current target reference list of the block points to the current target reference picture, the affine MVP pair is inserted into the candidate list. In yet another example, if the collocated block is an affine coded block and the other reference list of the current target reference list of the block points to the current target reference picture, the affine MVP pair is inserted into the candidate list.

Similar to spatial inherited affine MVP candidate, if the candidate list is not full after the above process, the scaled affine MVP pair can be added.

After adding the neighbouring inherited affine, corner derived affine, and temporal inherit affine MVP, if the number of MVP is still less than the predefined value, the normal AMVP MVP is used. Two control points of the MVP pair are filled with the same MV from one of the MVPs in the normal AMVP MVP list.

Note that, in the present invention, two-control-point MVP pair is used as the example. If the 6-parameter affine model, 8-parameter affine model, or other kind of affine model is used, the MVP pair can be an MVP triplet (three MVs as a MVP triplet set) or an MV set.

Affine MVP with a Temporal MV

In both affine Inter and affine Merge mode, different kinds of affine MVPs will be generated.

Figure 7:
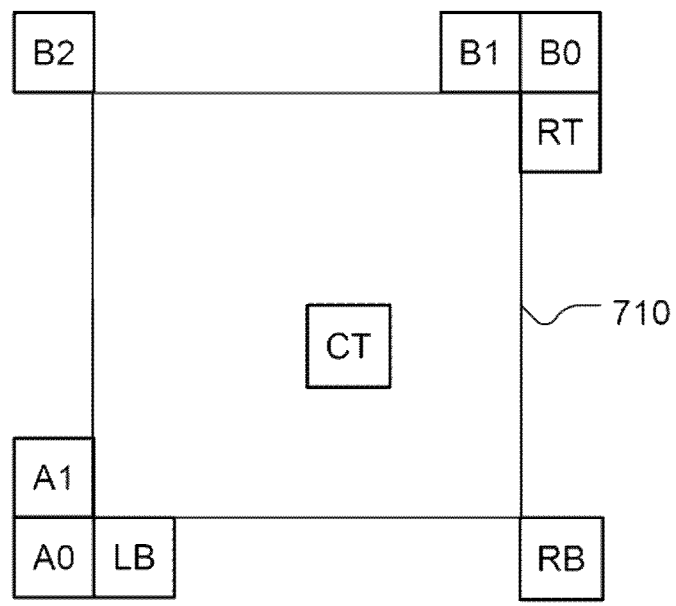
FIG. 7 illustrates an example of spatial neighbouring blocks and collocated blocks used for deriving affine candidates.

In ITU-T13-SG16-C1016, spatial inherited affine candidates are generated by inheriting the affine model neighbouring affine blocks. In the present invention, the temporal MV is used during deriving the MVP set (e.g. 2 control point MVs for 4-parameter affine model or 3 control point MVs for 6-parameter affine model) as spatial inherited affine candidates for the current block. The MVP derived is referred as the spatial-temporal inherited affine candidate in this disclosure. FIG. 7 illustrates an example of spatial neighbouring blocks and collocated blocks used for deriving affine candidates. In one embodiment, if the collocated blocks at position CT and/or RB in FIG. 7 are affine mode, the MVP set can be inherited as one spatial-temporal inherited affine candidate. In another embodiment, the predictor of the spatial-temporal inherited affine candidate at position CT or RB can be combined with the predictor generated by the spatial inherited affine candidate. The final predictor can be a weighted sum of the two predictors, such as the average of the two predictors. In another embodiment, the MVP set of current block is generated by combining the MVP set of the spatial-temporal inherited affine candidates at position CT or RB and the MVP set from spatial inherited affine candidates. The combination can be done by deriving the two MVP sets for the current block using spatial inherited MVP set and spatial-temporal inherited affine MVP set respectively, and then combining the two derived MVP sets (e.g. averaging the control point MVs in the MVP set) to be the final MVP set of current block. The combined MVP set can be a weighted sum of the two MVP sets. For example, the final MVP set is the average of the two MVP sets. In one embodiment, the combined MVP set can also be derived by using MVs from different sources (i.e., the spatial inherited affine candidate or the spatial-temporal inherited affine candidate) to generate final MVP set. For example, if 4-parameter affine model is used, the CP1 MV can be the MV of CP1 derived from one spatial inherited affine candidate and the CP2 MV can be the MV of CP2 derived from one spatial-temporal inherited affine candidate. Similarly, if 6-parameter affine model is used, the MVs of CP1 and CP2 can be inherited from spatial inherited affine candidates, and the MV of CP3 can be inherited from the spatial-temporal inherited affine candidates.

The MVP set of the spatial inherited affine candidate can be combined with the temporal MV. In one embodiment, the MVP set of the spatial inherited affine block will be combined with the temporal MV in their corresponding positions, and then the affine MVP set of current block can be derived.

In another embodiment, the MVP set of current block will be derived by the MVP set of neighbouring affine blocks. The derived MVPs will be combined with the temporal MV in the top-left and top-right positions of current block respectively if 4-parameter affine model is used. If 6-parameter affine model is used, the MVPs will be combined with the temporal MV in the top-left, top-right, and bottom-left positions of current block respectively.

In one embodiment, the spatial inherited candidates that are combined with a temporal MV will be checked first. For example, the order is (SP_A0+Temporal)→(SP_B0+Temporal)→(SP_B1+Temporal)→(SP_A1+Temporal)→(SP_B2+Temporal)→(SP_A0)→(SP_B0)→(SP_B1)→(SP_A1)→(SP_B2), where (SP_A0+Temporal) corresponds to a combined spatial inherited candidates (i.e., SP_A0) and temporal MV (Temporal), etc. In another embodiment, based on the same spatial position, the spatial inherited candidates that are combined with a temporal MV will be checked first. For example, the order is (SP_A0+Temporal)→(SP_A0)→(SP_B0+Temporal)→(SP_B0)→(SP_B1+Temporal)→(SP_B1)→(SP_A1+Temporal)→(SP_A1)→(SP_B2+Temporal)→(SP_B2).

In one embodiment, the spatial inherited candidates that are not combined with a temporal MV will be checked first. For example, the order is (SP_A0)→(SP_B0)→(SP_B1)→(SP_A1)→(SP_B2)→(SP_A0+Temporal)→(SP_B0+Temporal)→(SP_B1+Temporal)→(SP_A1+Temporal)→(SP_B2+Temporal). In another embodiment, for each same spatial position, the spatial inherited candidates that are not combined with a temporal MV will be checked first. For example, (SP_A0)→(SP_A0+Temporal)→(SP_B0)→(SP_B0+Temporal)→(SP_B1)→(SP_B1+Temporal)→(SP_A1)→(SP_A1+Temporal)→(SP_B2)→(SP_B2+Temporal).

In another embodiment, if the first checked MVP set is added to the candidate list, the other candidate need not to be checked. For example, the order becomes (SP_A0+Temporal) or (SP_A0)→(SP_B0+Temporal) or (SP_B0)→(SP_B1+Temporal) or (SP_B1)→(SP_A1+Temporal) or (SP_A1)→(SP_B2+Temporal) or (SP_B2) if the MVP set with a temporal MV is checked first. In another example, the order becomes (SP_A0) or (SP_A0+Temporal)→(SP_B0) or (SP_B0+Temporal)→(SP_B1) or (SP_B1+Temporal)→(SP_A1) or (SP_A1+Temporal)→(SP_B2) or (SP_B2+Temporal) if the MVP set without temporal MV is checked first.

It is also proposed to use the temporal MV during deriving constructed affine candidates.

In constructed affine candidates, the MVP set is generated by combing the neighbouring MV. For example, the MV of CP0 (i.e., $MV_A$ in FIG. 5) is obtained from group A, and the MV of CP1 (i.e., $MV_B$ in FIG. 5) is obtained from group B. If a 6-parameter model is used, the MV of CP2 (i.e., $MV_C$ in FIG. 5) is obtained from group C. When combined with a temporal MV, the temporal MV in the same position of group A will be one possible MV of CP0; the temporal MV in the same position of group B will be one possible MV of CP1; the temporal MV in the same position of group C will be one possible MV of CP2; the temporal MV in the bottom-right of the temporal collocated block (e.g. the block RB, the above block of the block RB, and/or the left block of the block RB in FIG. 6) will be one possible MV of CP3. In one embodiment, one or multiple MVs of CP0, CP1, or CP2 can be replaced by a temporal MV from collocated blocks. For example, the MV of CP0 can be replaced by the temporal MV from position RB in the collocated block. In another example, the MV of CP0 is replaced by the temporal MV in position RB, and the MV of CP1 is replaced by the temporal MV in position CT.

In one embodiment, the MV of CP0 is from B2 (in FIG. 7), the MV of CP1 can come from B1 (in FIG. 7) or B0 (in FIG. 7), the MV of CP2 can come from A1 (in FIG. 7) or A0 (in FIG. 7), and the MV of CP3 is from RB (in FIG. 7).

If 4-parameter is used, the MVP set can be MV of (CP0_B2, CP1_B1), (CP0_B2, CP1_B0), (CP0_B2, CP2_A1), (CP0_B2, CP2_A0), (CP2_A1, CP3_RB), (CP2_A0, CP3_RB), (CP3_RB, CP1_B1), and (CP3_RB, CP1_B0).

In one embodiment, the candidate with a temporal MV can be checked first. For example, if the MV of CP0, CP1, and CP2 are not from temporal MVs, the order will be (CP2_A1, CP3_RB)→(CP2_A0, CP3_RB)→(CP3_RB, CP1_B1)→(CP3_RB, CP1_B0)→(CP0_B2, CP1_B1)→(CP0_B2, CP1_B0)→(CP0_B2, CP2_A1)→(CP0_B2, CP2_A0). In another embodiment, the candidate without temporal MV will be checked first. For example, if the MV of CP0, CP1, and CP2 are not from a temporal MV, the order will be (CP0_B2, CP1_B1)→(CP0_B2, CP1_B0)→(CP0_B2, CP2_A1)→(CP0_B2, CP2_A0)→(CP2_A1, CP3_RB)→(CP2_A0, CP3_RB)→(CP3_RB, CP1_B1)→(CP3_RB, CP1_B0). In another embodiment, based on the same spatial position, the MVP set containing temporal MV is checked first. For example, if the MV of CP0, CP1, and CP2 are not from a temporal MV, the order will be (CP2_A1, CP3_RB)→(CP0_B2, CP2_A1)→(CP2_A0, CP3_RB)→(CP0_B2, CP2_A0)→(CP3_RB, CP1_B1)→(CP0_B2, CP1_B1)→(CP3_RB, CP1_B0)→(CP0_B2, CP1_B0). In another embodiment, for the same spatial position, the MVP set not containing temporal MV is checked first. For example, if the MV of CP0, CP1, and CP2 are not from a temporal MV, the order will be (CP0_B2, CP2_A1)→(CP2_A1, CP3_RB)→(CP0_B2, CP2_A0)→(CP2_A0, CP3_RB)→(CP0_B2, CP1_B1)→(CP3_RB, CP1_B1)→(CP0_B2, CP1_B0)→(CP3_RB, CP1_B0).

In another embodiment, if the first checked MVP set is added to the candidate list, the other candidate need not to be checked. For example, if the MV of CP0, CP1, and CP2 are not from a temporal MV, the order will be (CP2_A1, CP3_RB) or (CP0_B2, CP2_A1)→(CP2_A0, CP3_RB) or (CP0_B2, CP2_A0)→(CP3_RB, CP1_B1) or (CP0_B2, CP1_B1)→(CP3_RB, CP1_B0) or (CP0_B2, CP1_B0) if the MVP set with a temporal MV is checked first. In another example, if the MV of CP0, CP1, and CP2 are not from a temporal MV, the order will be (CP0_B2, CP2_A1) or (CP2_A1, CP3_RB)→(CP0_B2, CP2_A0) or (CP2_A0, CP3_RB)→(CP0_B2, CP1_B1) or (CP3_RB, CP1_B1)→(CP0_B2, CP1_B0) or (CP3_RB, CP1_B0) if the MVP set without a temporal MV is checked first.

If a 6-parameter model is used, the MVP set can be MV of (CP0_B2, CP1_B1, CP2_A1), (CP0_B2, CP1_B1, CP2_A0), (CP0_B2, CP1_B0, CP2_A1), (CP0_B2, CP1_B0, CP2_A0), (CP0_B2, CP1_B1, CP3_RB), (CP0_B2, CP1_B0, CP3_RB), (CP0_B2, CP3_RB, CP2_A1), (CP0_B2, CP3_RB, CP2_A0), (CP1_B1, CP3_RB, CP2_A1), (CP1_B1, CP3_RB, CP2_A0), (CP1_B0, CP3_RB, CP2_A0), and (CP1_B0, CP3_RB, CP2_A1).

In one embodiment, the candidate with a temporal MV can be checked first. For example, if the MV of CP0, CP1, and CP2 are not from a temporal MV, and all possible MVP sets are (CP0_B2, CP1_B1, CP2_A1), (CP0_B2, CP1_B1, CP2_A0), (CP0_B2, CP1_B0, CP2_A1), (CP0_B2, CP1_B0, CP2_A0), (CP0_B2, CP1_B1, CP3_RB), and (CP0_B2, CP1_B0, CP3_RB). The order will be (CP0_B2, CP1_B1, CP3_RB)→(CP0_B2, CP1_B0, CP3_RB)→(CP0_B2, CP1_B1, CP2_A1)→(CP0_B2, CP1_B1, CP2_A0)→(CP0_B2, CP1_B0, CP2_A1)→(CP0_B2, CP1_B0, CP2_A0). In another embodiment, the candidate with a temporal MV can be checked last. For example, if the MV of CP0, CP1, and CP2 are not from a temporal MV, and all possible MVP sets are (CP0_B2, CP1_B1, CP2_A1), (CP0_B2, CP1_B1, CP2_A0), (CP0_B2, CP1_B0, CP2_A1), (CP0_B2, CP1_B0, CP2_A0), (CP0_B2, CP1_B1, CP3_RB), and (CP0_B2, CP1_B0, CP3_RB), the order will be (CP0_B2, CP1_B1, CP2_A1)→(CP0_B2, CP1_B1, CP2_A0)→(CP0_B2, CP1_B0, CP2_A1)→(CP0_B2, CP1_B0, CP2_A0)→(CP0_B2, CP1_B1, CP3_RB)→(CP0_B2, CP1_B0, CP3_RB). In another embodiment, for the same spatial position, the MVP set containing temporal MV is checked first. For example, if the MV of CP0, CP1, and CP2 are not from a temporal MV, and all possible MVP set are (CP0_B2, CP1_B1, CP2_A1), (CP0_B2, CP1_B1, CP2_A0), (CP0_B2, CP1_B0, CP2_A1), (CP0_B2, CP1_B0, CP2_A0), (CP0_B2, CP1_B1, CP3_RB), and (CP0_B2, CP1_B0, CP3_RB), the order will be (CP0_B2, CP1_B1, CP3_RB)→(CP0_B2, CP1_B1, CP2_A1)→(CP0_B2, CP1_B1, CP2_A0)→(CP0_B2, CP1_B0, CP3_RB)→(CP0_B2, CP1_B0, CP2_A1)→(CP0_B2, CP1_B0, CP2_A0). In another embodiment, for the same spatial position, the MVP set not containing a temporal MV is checked first. For example, if the MV of CP0, CP1, and CP2 are not from temporal MV, and all possible MVP set are (CP0_B2, CP1_B1, CP2_A1), (CP0_B2, CP1_B1, CP2_A0), (CP0_B2, CP1_B0, CP2_A1), (CP0_B2, CP1_B0, CP2_A0), (CP0_B2, CP1_B1, CP3_RB), and (CP0_B2, CP1_B0, CP3_RB), the order will be (CP0_B2, CP1_B1, CP2_A1)→(CP0_B2, CP1_B1, CP3_RB)→(CP0_B2, CP1_B1, CP2_A0)→(CP0_B2, CP1_B0, CP2_A1)→(CP0_B2, CP1_B0, CP2_A0)→(CP0_B2, CP1_B0, CP3_RB).

In another embodiment, if the first checked MVP set is added to the candidate list, the other candidate need not to be checked. For example, if the MV of CP0, CP1, and CP2 are not from a temporal MV, and all possible MVP set are (CP0_B2, CP1_B1, CP2_A1), (CP0_B2, CP1_B1, CP2_A0), (CP0_B2, CP1_B0, CP2_A1), (CP0_B2, CP1_B0, CP2_A0), (CP0_B2, CP1_B1, CP3_RB), and (CP0_B2, CP1_B0, CP3_RB), the order will be (CP0_B2, CP1_B1, CP3_RB) or (CP0_B2, CP1_B1, CP2_A1)→(CP0_B2, CP1_B1, CP2_A0)→(CP0_B2, CP1_B0, CP2_A1)→(CP0_B2, CP1_B0, CP3_RB) or (CP0_B2, CP1_B0, CP2_A0) if the MVP set with a temporal MV is checked first. In another example, the order can be (CP0_B2, CP1_B1, CP2_A1) or (CP0_B2, CP1_B1, CP3_RB)→(CP0_B2, CP1_B1, CP2_A0)→(CP0_B2, CP1_B0, CP2_A1)→(CP0_B2, CP1_B0, CP2_A0) or (CP0_B2, CP1_B0, CP3_RB) if the MVP set without temporal MV is checked first.

In another embodiment, the constructed affine model can only use the temporal MV. For example, MVP sets (CP1_RT, CP3_RB), (CP2 LB, CP3_RB), (CP0_CT, CP3_RB) can be applied if 4-parameter is used. If 6-parameter is used, MVP set (CP1_RT, CP2_LB, CP3_RB) can be applied.

Note that, in the above mentioned methods, the maximum number of inherited affine candidates and constructed candidates can be specified.

In one embodiment, for affine Merge mode, the constructed affine candidates for 6-parameter affine candidates are checked before 4-parameter affine candidates. For candidates in the same affine type (e.g. 4-parameter or 6-parameter affine model), candidates without any temporal MV are checked before candidates with a temporal MV.

In another embodiment, for 6-parameter affine candidates, candidates containing the MVs derived from the MVs in top-left, top-right, and bottom-left positions are checked before candidates containing one or more MVs not derived from the MVs in top-left, top-right, and bottom-left positions. For 4-parameter affine candidates, candidates containing the MVs derived from the MVs in top-left and top-right positions are checked before candidates containing one or more MVs not derived from the MVs in top-left and top-right positions.

For example, the maximum number of affine constructed candidates in affine Merge mode is equal to 4, and the constructed affine Merge candidate list is as below:
Cand-1: {TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)

Cand-2: {TR, BL, Col}, where the Col is the temporal collocated MV.
Cand-3: {TL, TR}
Cand-4: {TL, BL}

If candidates with 3 control points are used, the fourth control point MV can be derived by using the three control points. For example, in Cand-2, TL'=TR+BL−Col. If candidates with 2 control points are used, the third control point (e.g. TR in Cand-4) can be derived by using 4-parameter affine model.

For example, the maximum number of affine constructed candidates in affine Merge mode is equal to 5, and the constructed affine Merge candidate list is as below:

Cand-1: {TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TR, BL, Col}, where the Col is the temporal collocated MV.
Cand-3: {TL, TR}
Cand-4: {TL, BL}
Cand-5: {TR, Col}

If candidates with 3 control points are used, the fourth control point MV can be derived by using the three control points. For example, in Cand-2, TL'=TR+BL−Col. If candidates with 2 control points are used, the third control point (e.g. TR in Cand-4 and TL in Cand-5) can be derived by using 4-parameter affine model.

For example, the maximum number of affine constructed candidates in affine Merge mode is equal to 5, and the constructed affine Merge candidate list is as below:

Cand-1: TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TL, TR, Col}, where the Col is the temporal collocated MV.
Cand-3: {TL, BL, Col}
Cand-4: {TR, BL, Col}
Cand-5: {TL, TR}

If candidates with 3 control points are used, the fourth control point MV can be derived by using the three control points. For example, in Cand-2, BL'=TL+Col−TR, in Cand-3, TR'=TL+Col−BL, in Cand-4, TL'=TR+BL−Col.

For example, the maximum number of affine constructed candidates in affine Merge mode is equal to 5, and the constructed affine Merge candidate list is as below:

Cand-1: {TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TR, BL, Col}, where the Col is the temporal collocated MV.
Cand-3: {TL, TR}
Cand-4: {TL, BL}
Cand-5: {Col as TL, TR, BL} (TL is replaced by Col)

If candidates with 3 control points are used, the fourth control point MV can be derived by using the three control points. For example, in Cand-2, TL'=TR+BL−Col. If candidates with 2 control points are used, the third control point (e.g. TR in Cand-4) can be derived by using 4-parameter affine model.

For example, the maximum number of affine constructed candidates in affine Merge mode is equal to 6, and the constructed affine Merge candidate list is as below:

Cand-1: {TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TL, TR, Col}, where the Col is the temporal collocated MV.
Cand-3: {TL, BL, Col}
Cand-4: {TR, BL, Col}
Cand-5: {TL, TR}
Cand-6: {TL, BL}

If candidates with 3 control points are used, the fourth control point MV can be derived by using the three control points. For example, in Cand-2, BL'=TL+Col−TR, in Cand-3, TR'=TL+Col−BL, in Cand-4, TL'=TR+BL−Col. If candidates with 2 control points are used, the third control point (e.g. TR in Cand-6) can be derived by using 4-parameter affine model.

For example, the maximum number of affine constructed candidates in affine Merge mode is equal to 6, and the constructed affine Merge candidate list is as below:

Cand-1: {TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TR, BL, Col}, where the Col is the temporal collocated MV.
Cand-3: {TL, TR}
Cand-4: {TL, BL}
Cand-5: {TR, Col}
Cand-6: {BL, Col}

If candidates with 3 control points are used, the fourth control point MV can be derived by using the three control points. For example, in Cand-2, BL'=TL+Col−TR. If candidates with 2 control points are used, the third control point (e.g. TR in Cand-4, TL in Cand-5, TL and TR in Cand-6) can be derived by using 4-parameter affine model.

For example, the maximum number of affine constructed candidates in affine Merge mode is equal to 7, and the constructed affine Merge candidate list is as below:

Cand-1: {TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TL, TR, Col}, where the Col is the temporal collocated MV.
Cand-3: {TL, BL, Col}
Cand-4: {TR, BL, Col}
Cand-5: {Col as TL, TR, BL} (TL is replaced by Col)
Cand-6: {TL, Col as TR, BL} (TR is replaced by Col)
Cand-7: {TL, TR, Col as BL} (BL is replaced by Col)

If candidates with 3 control points are used, the fourth control point MV can be derived by using the three control points. For example, in Cand-2, BL'=TL+Col−TR, in Cand-3, TR'=TL+Col−BL, in Cand-4, TL'=TR+BL−Col.

For example, the maximum number of affine constructed candidates in affine Merge mode is equal to 8, and the constructed affine Merge candidate list is as below:

Cand-1: {TL, TR, BL}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TR, BL, Col}, where the Col is the temporal collocated MV.
Cand-3: {TL, B1 as TR, BL}
Cand-4: {TL, TR, C1 as BL}
Cand-5: {TL, B1 as TR, C1 as BL}
Cand-6: {C1 as BL, BL as TR, Col}

Cand-7: {TL, B1 as TR, Col}
Cand-8: {C1 as BL, B1 as TR, Col}

If candidates with 3 control points are used, the fourth control point MV can be derived by using the three control points. For example, in Cand-2 and Cand-8, TL'=TR+BL−Col, in Cand-6, TR'=TL+Col−BL, in Cand-7, BL'=TL+Col−TR.

In one embodiment, for affine Merge mode, the constructed affine for 4-parameter affine candidates are checked before 6-parameter affine candidates. For candidates in the same affine type (e.g. 4-parameter or 6-parameter affine model), candidates without temporal MV are checked before candidates with temporal MV.

In another embodiment, for 6-parameter affine candidates, candidates containing the MVs derived from the MVs in top-left, top-right, and bottom-left positions are checked before candidates containing one or more MVs not derived from the MVs in top-left, top-right, and bottom-left positions. For 4-parameter affine candidates, candidates containing the MVs derived from the MVs in top-left, and top-right positions are checked before candidates containing one or more MVs not derived from the MVs in top-left, and top-right positions.

For example, the maximum number of affine constructed candidates in affine Merge mode is equal to 5. And the order is:

Cand-1: {TL, TR}, where the TL is the top-left MV (e.g. from set-A in FIG. 5), TR is the top-right MV (e.g. from set-B in FIG. 5)
Cand-2: {TL, BL}, where BL is the bottom-left MV (e.g. from set-C in FIG. 5).
Cand-3: {TL, TR, BL}
Cand-4: {TR, BL, Col}, where the Col is the temporal collocated MV.
Cand-5: {Col as TL, TR, BL} (TL is replaced by Col)

If candidates with 3 control points are used, the fourth control point MV can be derived by using the three control points. For example, in Cand-4, TL'=TR+BL−Col. If candidates with 2 control points are used, the third control point (e.g. TR in Cand-2) can be derived by using 4-parameter affine model.

For example, the maximum number of affine constructed candidates in affine Merge mode is equal to 6. And the order is:

Cand-1: {TL, TR}, where the TL is the top-left MV (e.g. from set-A in FIG. 5), TR is the top-right MV (e.g. from set-B in FIG. 5), BL is the bottom-left MV (e.g. from set-C in FIG. 5)
Cand-2: {TL, BL}, where the BL is the bottom-left MV (e.g. from set-C in FIG. 5).
Cand-3: {TL, TR, BL}
Cand-4: {TL, TR, Col}, where the Col is the temporal collocated MV.
Cand-5: {TL, BL, Col}
Cand-6: {TR, BL, Col}

If candidates with 3 control points are used, the fourth control point MV can be derived by using the three control points. For example, in Cand-4, BL'=TL+Col−TR, in Cand-5, TR'=TL+Col−BL, in Cand-6, TL'=TR+BL−Col. If candidates with 2 control points are used, the third control point (e.g. TR in Cand-2) can be derived by using 4-parameter affine model.

In one embodiment, the constructed affine candidates are inserted after the inherited affine candidates. In one example, if the unified affine Merge candidate list is applied, the spatial normal Merge candidate and/or spatial affine Merge candidate is inserted into the list first, then the temporal Merge candidates, then the constructed affine Merge candidates. In another example, if the unified affine Merge candidate list is applied, the spatial normal Merge candidate and/or spatial affine Merge candidate is inserted into the list first, then the constructed affine merge candidates, then the temporal merge candidates. At most two constructed affine candidates are added.

In one embodiment, for spatial inherited affine candidate derivation in affine AMVP mode and affine Merge mode candidates, the 4-parameter model is used regardless of the affine motion model used in the neighbouring affine coded block. For the above neighbouring block, its bottom-left and bottom-right control point MVs or one or more bottom row MVs are used for deriving the affine candidate of the current block. For the left neighbouring block, its top-right and bottom-right control point MVs or one or more right-most column MVs are used for deriving the affine candidate of the current block.

In one embodiment, if after all the affine inherited candidates and the constructed candidates are added, the candidate list is still not full, the zero MV set are added. In P-slice, two or three zero MVs (i.e., MVx=0, MVy=0) are added into the candidate list for the two or three control point MVs and. In AMVP mode, the zero MV set are added until the candidate list is full. In Merge mode, for P-slice, the LIST_0 zero MV set is used. For B-slice, the LIST_0 and LIST_1 zero MV sets are used. In one example, the zero MVs with different reference indices are inserted. For example, if the List_0 has 3 reference pictures, three zero MV sets with refIdx0, 1, and 2 are added. If the candidate list is not full, the zero MV set with refIdx=0 are added until the candidate list is full. In another example, the zero MV with refIdx=0 are added until the candidate list is full. In another embodiment, if after all the affine inherited candidates and the constructed candidate are added, the candidate list is still not full, the normal AMVP candidate or normal Merge candidate are added. The two or three control point MVs are fill with the normal AMVP candidate MV or the normal Merge candidate MV.

Affine MVP Derivation in Affine AMVP Mode

In one embodiment, for affine AMVP MVP set derivation, the inherited affine candidate is added first, then the constructed affine candidate.

For the inherited affine candidate, the affine candidates are added in order. The pruning process (i.e., redundant candidate removal) can be performed. One example, the to-be-added affine candidate is compared with all the affine candidate in the candidate list. If the to-be-added affine candidate is redundant, it is not added. In another example, the to-be-added affine candidate is only compared with the first affine candidate in the candidate list. In another example, the to-be-added affine candidate is only compared with the last added affine candidate in the candidate list. In another example, the pruning can be only performed N times. N can be 1, 2, or 3. If N times of pruning is performed, the rest affine candidate(s) can be added to the list directly. For example, N can be 1. For the first affine candidate, it is added into the list directly. For the second affine candidate, it is compared with the first affine candidate. If it is redundant, it is not added into the list. For the rest affine candidates, they can be added into the list directly until the candidate list is full.

For affine candidate pruning, all control point MVs are compared. If all MVs are the same or the MVDs are smaller than a threshold, it is treated as redundant. In another embodiment, one or partial control point MVs are compared. If the one control point MV or the selected partial control point MVs are the same or the MVDs are smaller than a threshold, it is treated as redundant. In one example, the one control point can be the top-left control point. It can only compare the top-left control point MV to decide whether the affine candidate is redundant or not. The pruning process can be also applied to constructed affine candidate and affine Merge candidate derivation.

For the constructed affine candidate, at most N MVP set are added. N can be 1 or 2. For the 4-parameter affine model, for the first constructed candidate, the first available MV in group A with the same target reference picture and the first available MV in group B with the same target reference picture are used. If the neighbouring block is bi-prediction, the reference pictures in both reference lists will be checked. For example, if the block containing the first to-be-checked position is bi-prediction, and the current target reference list is List 0, then the neighbouring block's reference picture in List 0 is checked first. If the reference picture in List 0 is the same as the target reference picture, then the MV in List 0 is the first available MV in that group. Otherwise (if the reference picture in List 0 is not the same as the target reference picture), the reference picture in List 1 is checked. If the reference picture in List 1 is same as the target reference picture, then the MV in List 1 is the first available MV in that group. Since the available MV must have the same reference picture as the target reference picture, MV scaling is not required. The order for group A search can be A0→A1→A2 or A0→A2→A1. The order for group B search can be B0→B1 or B1→B0. If one of the MVs is not available, this candidate is not inserted. For the second constructed candidate, the first available MV in group A with the same target reference picture and the first available MV in group C with the same target reference picture are used. The order for group C search can be C0→C1 or C1→C0. For the third constructed candidate, the second available MV in group A with the same target reference picture and the second available MV in group B with the same target reference picture are used. Again, the order for group A search can be A0→A1→A2 or A0→A2→A1 and the order for group B search can be B0→B1 or B1→B0. If there is only one available MV in the group, the one available MV is used in that group. For the fourth constructed candidate, the second available MV in group A with the same target reference picture and the second available MV in group C with the same target reference picture are used. In another embodiment, for the constructed candidate MV pair mentioned above, one or more control point MVs can be replaced by the temporal collocated MV.

In another embodiment, for the 4-parameter affine model, for the first constructed candidate, the first available MV in group A with the same target reference picture and the first available MV in group B with the same target reference picture are used. If the neighbouring block is bi-prediction, the reference pictures in both reference lists will be checked. For example, if the block containing the first to-be-checked position is bi-prediction, and the current target reference list is List 0, then the neighbouring block's reference picture in List 0 is checked first. If the reference picture in List 0 is same as the target reference picture, then the MV in List 0 is the first available MV in that group. Otherwise (i.e., the reference picture in List 0 not the same as the target reference picture), the reference picture in List 1 is checked. If the reference picture in List 1 is same as the target reference picture, then the MV in List 1 is the first available MV in that group. Since the available MV must have the same reference picture as the target reference picture, MV scaling is not required. The order for group A search can be A0→A1→A2 or A0→A2→A1 and the order for group B search can be B0→B1 or B1→B0. If one of the MVs is not available, this candidate is not inserted. For the second constructed candidate, the second available MV in group A with the same target reference picture and the second available MV in group B with the same target reference picture are used. If there is only one available MV in the group, the one available MV is used in that group. In another example, for the second constructed candidate, the first available MV in group A with the same target reference picture and the second available MV in group B with the same target reference picture are used. If there is only one available MV in the group, the one available MV is used in that group. In another example, for the second constructed candidate, the second available MV in group A with the same target reference picture and the first available MV in group B with the same target reference picture are used. If there is only one available MV in the group, the one available MV is used in that group. In another embodiment, for the constructed candidate MV pair above, one or more control point MVs can be replaced by the temporal collocated MV.

For the 6-parameter affine model, for the first constructed candidate, the first available MV in group A with the same target reference picture and the first available MV in group B with the same target reference are used. The order for group A search can be A0→A1→A2 or A0→A2→A1 and the order for group B search can be B0→B1 or B1→B0. If one of the MVs is not available, this candidate is not inserted. The third control point (i.e., the bottom-left control point) can be derived from the first (i.e., from the group A) and the second (i.e., from the group B) control points. For the second constructed candidate, the first available MV in group A with the same target reference picture and the first available MV in group C with the same target reference picture are used. The order for group C search can be C0→C1 or C1→C0. The third control point (i.e., the top-right control point) can be derived from the first (i.e., from the group A) and the second (i.e., from the group C) control points. For the third constructed candidate, the second available MV in group A with the same target reference picture and the second available MV in group B with the same target reference picture are used. If there is only one available MV in the group, the one available MV is used in that group. The third control point (i.e., the bottom-left control point) can be derived from the first (i.e., from the group A) and the second (i.e., from the group B) control points. For the fourth constructed candidate, the second available MV in group A with the same target reference picture and the second available MV in group C with the same target reference picture are used. The third control point (i.e., the top-right control point) can be derived from the first (i.e., from the group A) and the second (i.e., from the group C) control points. In another embodiment, for the constructed candidate MV pair above, one or more control point MV can be replaced by the temporal collocated MV.

In another embodiment, for 6-parameter affine model, for the first constructed candidate, the first available MV in group A with the same target reference picture, the first available MV in group B with the same target reference picture, and the first available MV in group C with the same target reference picture are used. If the neighbouring block is bi-prediction, the reference pictures in both reference lists will be checked. For example, if the block containing the first to-be-checked position is bi-prediction, and the current target reference list is List 0, then the neighbouring block's reference picture in List 0 is checked first. If the reference picture in List 0 is same as the target reference picture, then the MV in List 0 is the first available MV in that group. Otherwise (if the reference picture in List 0 is not same as the target reference picture), the reference picture in List 1 is checked. If the reference picture in List 1 is same as the target reference picture, then the MV in List 1 is the first available MV in that group. Since the available MV must have the same reference picture as the target reference picture, MV scaling is not required. The order for group A search can be A0→A1→A2 or A0→A2→A1 and the order for group B search can be B0→B1 or B1→B0. The order for group C search can be C0→C1 or C1→C0. If one of the MVs is not available, this candidate is not inserted. For the second constructed candidate, the second available MV in group A with the same target reference picture, the second available MV in group B with the same target reference picture, and the second available MV in group C with the same target reference picture are used. If one of the MVs is not available, this candidate is not inserted. If there is only one available MV in the group, the one available MV is used in that group. In another embodiment, for the constructed candidate MV pair above, one or more control point MVs can be replaced by the temporal collocated MV.

In another embodiment, for the 6-parameter affine model, for the first constructed candidate, the first available MV in group A with the same target reference picture (order can be A0→A1→A2 or A0→A2→A1), the first available MV in group B with the same target reference picture (order can be B0→B1 or B1→B0), and the first available MV in group C with the same target reference picture (order can be C0→C1 or C1→C0) are used. If the MV in group A exists and the MV in group B doesn't exist, the MV in group A is used as the MV in group B. If an MV in group A exists and the MV in group C doesn't exist, the MV in group A is used as the MV in group C. If the MV in group A doesn't exist and the MV in group B or C exists, the MV in group B or C is used as the MV in group A. In another example, if MV in group A does not exist, this candidate is not inserted. If no MV exists in any group, this candidate is not inserted. For the second constructed candidate, the second available MV in group A with the same target reference picture, the second available MV in group B with the same target reference picture, and the second available MV in group C with the same target reference picture are used. If there is only one available MV in the group, the one available MV is used in that group. If an MV in group A exists and the MV in group B doesn't exist, the MV in group A is used as the MV in group C doesn't exist, the MV in group A is used as the MV in group C. If MV in group A doesn't exist and the MV in group B or C exists, the MV in group B or C is used as the MV in group A. In another example, if MV in group A does not exist, this candidate is not inserted. If all MV in each group are not exist, this candidate is not inserted. In another embodiment, for the constructed candidate MV pair above, one or more control point MVs can be replaced by the temporal collocated MV.

In another embodiment, for the 6-parameter affine model, for the first constructed candidate, the first available MV in group A with the same target reference picture the first available MV in group B with the same target reference picture, and the first available MV in group C with the same target reference picture are used. The order for group A search can be A0→A1→A2 or A0→A2→A1 and the order for group B search can be B0→B1 or B1→B0. The order for group C search can be C0→C1 or C1→C0. If one MV in one group doesn't exist, the MV can be derived from the MVs in other two groups by using 4-parameter affine model or filled by one of the other two MVs in other two groups. If no MV exists in any group, this candidate is not inserted. For the second constructed candidate, the second available MV in group A with the same target reference picture, the second available MV in group B with the same target reference picture, and the second available MV in group C with the same target reference picture are used. If one MV in one group doesn't exist, the MV can be derived from the MVs in other two groups by using 4-parameter affine model or filled by one of the other two MVs in other two groups. If no MV exists in any group, this candidate is not inserted. In another embodiment, for the constructed candidate MV pair above, one or more control point MVs can be replaced by the temporal collocated MV.

In another embodiment, for the 6-parameter affine model, for the first constructed candidate, the first available MV in group A with the same target reference picture and the first available MV in group B with the same target reference picture are used. The order for group A search can be A0→A1→A2 or A0→A2→A1 and the order for group B search can be B0→B1 or B1→B0. If one of the MVs is not available, this candidate is not inserted. The third control point is derived from two control points (i.e., the MV in group A and the MV in group B). For the second constructed candidate, the second available MV in group A with the same target reference picture and the second available MV in group B with the same target reference picture are used. If there is only one available MV in the group, the one available MV is used in that group. In another example, for the second constructed candidate, the first available MV in group A with the same target reference picture and the second available MV in group B with the same target reference picture are used. If there is only one available MV in the group, the one available MV is used in that group. In another example, for the second constructed candidate, the second available MV in group A with the same target reference picture and the first available MV in group B with the same target reference picture are used. If there is only one available MV in the group, the one available MV is used in that group. The third control point is derived from two control points (i.e., the MV in group A and the MV in group B). In another embodiment, for the constructed candidate MV pair above, one or more control point MVs can be replaced by the temporal collocated MV.

In the above mentioned method, the number of added constructed affine candidates can be specified. For example, the maximum number of constructed affine candidates can be 1 or 2.

In one embodiment, if after all the affine inherited candidates and the constructed candidate are added, the candidate list is still not full, the zero MV set are added. In P-slice, two or three zero MVs (i.e., MVx=0, MVy=0) are added into the candidate list for the two or three control point MVs. In AMVP mode, the zero MV set is added until the candidate list is full. In Merge mode, for P-slice, the LIST_0 zero MV set is used. For B-slice, the LIST_0 and LIST_1 zero MV sets are used. In one example, the zero MV with different reference indices are inserted. For example, if the List_0 has 3 reference pictures, three zero MV sets with refIdx=0, 1, and 2 are added. If the candidate list is not full, the zero MV sets with refIdx=0 are added until the candidate list is full. In another example, the zero MVs with refIdx=0 are added until the candidate list is full. In another embodiment, if after all the affine inherited candidates and the constructed candidate are added, the candidate list is still not full, the normal AMVP candidate or normal Merge candidate are added. The two or three control point MVs are filled with the normal AMVP candidate MV or the normal Merge candidate MV.

Affine Candidate List Pruning

For affine AMVP candidate derivation or affine Merge candidate list derivation, the affine candidates are added in order. The pruning process (i.e., redundant candidate removal) can be performed. For example, the to-be-added affine candidate is compared with all the affine candidates in the candidate list. If the to-be-added affine candidate is redundant, it is not added. In another example, the to-be-added affine candidate is only compared with the first affine candidate in the candidate list. In another example, the to-be-added affine candidate is only compared with the last added affine candidate in the candidate list. In another example, the pruning can be only performed N times. N can be 1, 2, or 3. If N times of pruning is performed, the rest affine candidate(s) can be added to the list directly. For example, N can be 1. For the first affine candidate, it is added into the list directly. For the second affine candidate, it is compared with the first affine candidate. If it is redundant, it is not added into the list. For the rest affine candidates, they can be added into the list directly until the candidate list is full.

For affine candidate pruning, all control point MVs are compared. If all MVs are the same or the MVDs are smaller than a threshold, it is treated as redundant. In another embodiment, one or partial control point MVs are compared. If the one control point MV or the selected partial control point MVs are the same or the MVDs are smaller than a threshold, it is treated as redundant. In one example, the one control point can be the top-left control point. The process will only compare the top-left control point MV to decide whether the affine candidate is redundant or not. For affine Merge candidate derivation, the reference list and reference index also need to be compared.

Affine Type Syntax Design

If 4-parameter affine model and 6-parameter affine model switching is supported, an affine type flag is required. In one embodiment, whether the affine type flag is signalled depends on the shape of current block. For example, for blocks with width<N*height, N can be 2, 3, or 4, the affine type flag is not signalled and is inferred as 4-parameter (or 6-parameter) affine model. In another example, for blocks with width<N*height or height<N*width, N can be 2, 3, or 4, the affine type flag is not signalled and is inferred as 4-parameter (or 6-parameter) affine model. In another example, for blocks with width=N*height, N can be 1, 2, 3, or 4, the affine type flag is not signalled and is inferred as 4-parameter (or 6-parameter) affine model. The control point position also depends on the block shape. For example, for a flat block, the top-left and top-right (or bottom-left and bottom-right) corners are used as the control points. For the tall and narrow block, the top-left and bottom-left (or the top-right and bottom-right) corners are used as the control points. In another example, for square blocks, the affine type flag is not signalled and is inferred as 6-parameter affine model. In another embodiment, whether the affine type flag is signalled depends on the size of current block. For example, for blocks with width*height<32, the affine type flag is not signalled and is inferred as 4-parameter affine model. In another example, for blocks with width*height>128, the affine type flag is not signalled and is inferred as 6-parameter affine model.

In one embodiment, the affine type flag of each block is stored, and multiple context models are used, the context model selection for an affine type flag can depend on the affine type flag of the neighbouring blocks. For example, the affine type of the left and the above block are used for context formation. If both of them use the first type, the first context is used. If one of them uses the first type, the second context is used. If both of them use the second type, the third context is used.

In another embodiment, the affine type flag is stored for the current block only, the affine type flag can be coded by single context model or bypass coding. In this case, there is no need to reference neighbouring blocks' affine type flag.

In implementation, to make the coding process simpler and more consistent, the MVP set derivation and sub-block MV derivation of the affine block for both 4-parameter and 6-parameter affine models can use the process of 6-parameter affine model. In this way, if the affine type flag is coded by single context model or bypass coding, which are not related to the affine type flag of neighbouring blocks, the affine type flag only needs to be stored for the current block. Therefore, memory for storing neighbouring blocks' information can be reduced.

Any of the foregoing proposed methods can be implemented in encoders and/or decoders. For example, any of the proposed methods can be implemented in MV derivation module of an encoder, and/or an MV derivation module of a decoder. Alternatively, any of the proposed methods can be implemented as a circuit coupled to the MV derivation module of the encoder and/or the MV derivation module of the decoder, so as to provide the information needed by the MV derivation module.

Context Modelling for Affine_Flag

To reduce the complexity and storage requirement in parsing stage, it is proposed to use a fixed single context for affine_flag coding. In this way, the affine_flag (for affine AMVP mode coding) parsing is neighbouring information independent. In another example, multiple contexts is used to code the affine_flag. The information of the neighbouring blocks are used. For example, the information corresponds to whether the neighbouring block is coded in affine mode, such as affine AMVP mode (not including affine Merge mode) or affine Merge mode (including sub-block Merge mode). In one example, the above and the left blocks are used. If none of them is coded in the affine mode, a first context is used. If one of them is coded in the affine mode, a second context is used. If both of them are coded in the affine mode, a third context is used. Single or multiple neighbouring can be used for context modelling. For example, more than two neighbouring blocks (e.g. the block A0, A1, B0, B1, and B2 in FIG. 4A) can be used for context modelling. The number of the neighbouring blocks that is coded as the affine mode can be used for context modelling. In another example, the context modelling of affine_flag can depend on the inter_dir (i.e., the reference list selection) or the CU size/area/depth.

Figure 8:
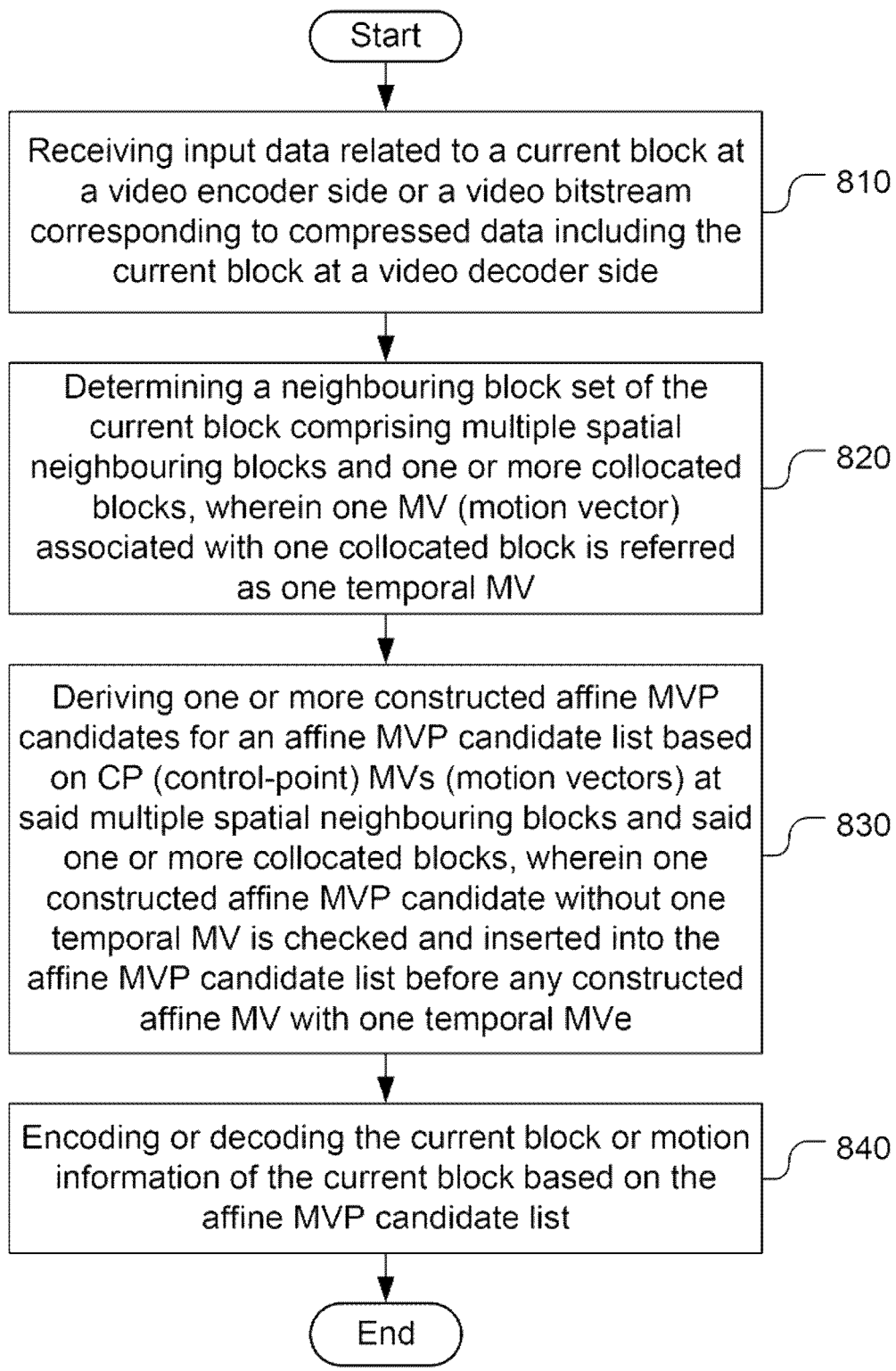
FIG. 8 illustrates an exemplary flowchart for a video coding system with an affine mode incorporating an embodiment of the present invention.

FIG. 8 illustrates an exemplary flowchart for a video coding system with an affine mode incorporating an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data related to a current block are received at a video encoder side or a video bitstream corresponding to compressed data including the current block is received at a video decoder side in step 810. A neighbouring block set of the current block comprising multiple spatial neighbouring blocks and one or more collocated blocks is determined in step 820, where one MV (motion vector) associated with one collocated block is referred as one temporal MV. One or more constructed affine MVP candidates are derived for an affine MVP candidate list based on CP (control-point) MVs (motion vectors) at said multiple spatial neighbouring blocks and said one or more collocated blocks in step 830, where one constructed affine MVP candidate without one temporal MV is checked and inserted into the affine MVP candidate list before any constructed affine MV with one temporal MV. The current block or motion information of the current block is encoded or decoded based on the affine MVP candidate list in step 840.

Figure 9:
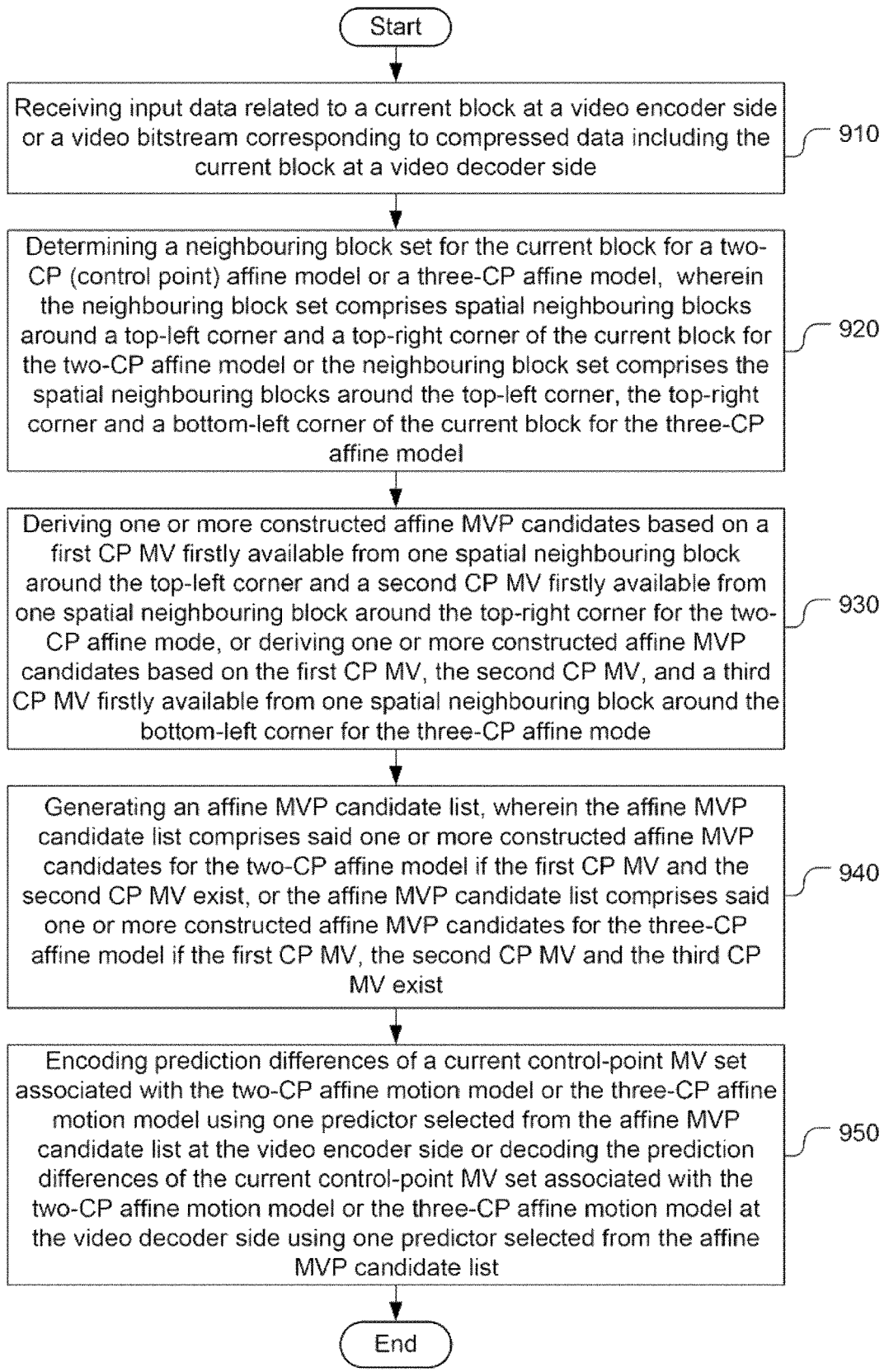
FIG. 9 illustrates another exemplary flowchart for a video coding system with an affine mode incorporating an embodiment of the present invention.

FIG. 9 illustrates another exemplary flowchart for a video coding system with an affine mode incorporating an embodiment of the present invention. According to this method, input data related to a current block are received at a video encoder side or a video bitstream corresponding to compressed data including the current block is received at a video decoder side in step 910. A neighbouring block set is determined for the current block for a two-CP (control point) affine model or a three-CP affine model in step 920, wherein the neighbouring block set comprises spatial neighbouring blocks around a top-left corner and a top-right corner of the current block for the two-CP affine model or the neighbouring block set comprises the spatial neighbouring blocks around the top-left corner, the top-right corner and a bottom-left corner of the current block for the three-CP affine model. In step 930, one or more constructed affine MVP candidates are derived based on a first CP MV firstly available from one spatial neighbouring block around the top-left corner and a second CP MV firstly available from one spatial neighbouring block around the top-right corner for the two-CP affine mode, or one or more constructed affine MVP candidates are derived based on the first CP MV, the second CP MV, and a third CP MV firstly available from one spatial neighbouring block around the bottom-left corner for the three-CP affine mode. In step 940, an affine MVP candidate list is generated, wherein the affine MVP candidate list comprises said one or more constructed affine MVP candidates for the two-CP affine model if the first CP MV and the second CP MV exist, or the affine MVP candidate list comprises said one or more constructed affine MVP candidates for the three-CP affine model if the first CP MV, the second CP MV and the third CP MV exist. In step 950, prediction differences of a current control-point MV set associated with the two-CP affine motion model or the three-CP affine motion model is encoded using one predictor selected from the affine MVP candidate list at the video encoder side or the prediction differences of the current control-point MV set associated with the two-CP affine motion model or the three-CP affine motion model is decoded at the video decoder side using one predictor selected from the affine MVP candidate list.

The flowcharts shown are intended to illustrate an example of video according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding performed by a video encoder or a video decoder that utilizes motion vector prediction (MVP) to code a motion vector (MV) associated with a block coded with coding modes including an affine motion mode, the method comprising:

receiving input data related to a current block at a video encoder side or a video bitstream corresponding to compressed data including the current block at a video decoder side;

determining a neighbouring block set of the current block comprising multiple spatial neighbouring blocks and one or more collocated blocks, wherein one MV (motion vector) associated with one collocated block is referred as one temporal MV;

deriving one or more constructed affine MVP candidates for an affine MVP candidate list based on CP (control-point) MVs (motion vectors), the CP MVs being derived from said multiple spatial neighbouring blocks and said one or more collocated blocks, wherein one constructed affine MVP candidate derived without one temporal MV is checked and inserted into the affine MVP candidate list before any constructed affine MV with one temporal MV, wherein said one or more constructed affine MVP candidates are derived according to an order corresponding to {TL, TR, BL}→{TL, TR, Col}→{TL, BL, Col}→{TR, BL, Col}→{TL, TR}→{TL, BL}, wherein TL corresponds to a top-left MV, TR corresponds to a he top-right MV, BL corresponds to a bottom-left MV and Col corresponds to one temporal MV; and encoding or decoding the current block or motion information of the current block based on the affine MVP candidate list.

2. The method of claim 1, wherein one or more first constructed affine MVP candidates associated with a 6-parameter affine model are checked before one or more second constructed affine MVP candidates associated with a 4-parameter affine model.

3. The method of claim 1, wherein one or more first constructed affine MVP candidates associated with a 6-parameter affine model containing one or more MVs derived from the MVs in top-left, top-right, and bottom-left positions are checked before one or more second constructed affine MVP candidates associated with a 6-parameter affine model containing one or more MVs not derived from the MVs in the top-left, top-right, and bottom-left positions.

4. The method of claim 1, wherein one or more first constructed affine MVP candidates associated with a 4-parameter affine model containing one or more MVs derived from the MVs in top-left and top-right positions are checked before one or more second constructed affine MVP candidates associated with a 4-parameter affine model containing one or more MVs not derived from the MVs in the top-left and top-right positions.

5. The method of claim 1, wherein for a 4-parameter affine model, said one or more constructed affine MVPs are checked and inserted according to a predefined order corresponding to (CP0_B2, CP1_B1)→(CP0_B2, CP1_B0)→(CP0_B2, CP2_A1)→(CP0_B2, CP2_A0)→(CP2_A1, CP3_RB)→(CP2_A0, CP3_RB)→(CP3_RB, CP1_B1)→(CP3_RB, CP1_B0) if no MV associated with CP0, CP1 and CP2 is one temporal MV, and where CPi_XX corresponds to one MV associated with control point i at location XX, i is equal to 0, 1, 2 or 3, and XX corresponds to A0 (left-bottom block), A1 (left block), B0 (above-right block), B1 (above block), B2 (above-left block), or RB (collocated right-bottom block).

6. The method of claim 1, wherein for a 6-parameter affine model, said one or more constructed affine MVPs are checked and inserted according to a predefined order corresponding to (CP0_B2, CP1_B1, CP2_A1)→(CP0_B2, CP1_B1, CP2_A0)→(CP0_B2, CP1_B0, CP2_A1)→(CP0_B2, CP1_B0, CP2_A0)→(CP0_B2, CP1_B1, CP3_RB)→(CP0_B2, CP1_B0, CP3_RB) if no MV associated with CP0, CP1 and CP2 is one temporal MV, and where CPi_XX corresponds to one MV associated with control point i at location XX, i is equal to 0, 1, 2 or 3, and XX corresponds to A0 (left-bottom block), A1 (left block), B0 (above-right block), B1 (above block), B2 (above-left block), or RB (collocated right-bottom block).

7. The method of claim 1, wherein if the affine MVP candidate list is not full after all derived affine MVP candidates are inserted, one or more zero-MV MVP candidates are added to the affine MVP candidate list.

8. The method of claim 1, wherein one to-be-added constructed affine MVP candidate is compared to one or more affine MVP candidates in the affine MVP candidate list and said one to-be-added constructed affine MVP candidate is not inserted to the affine MVP candidate list if said one to-be-added constructed affine MVP candidate is redundant.

9. The method of claim 1, wherein one to-be-added constructed affine MVP candidate is compared to a first affine MVP candidate or a last affine MVP candidate in the affine MVP candidate list, and said one to-be-added constructed affine MVP candidate is not inserted to the affine MVP candidate list if said one to-be-added constructed affine MVP candidate is redundant.

10. An apparatus for video coding performed by a video encoder or a video decoder that utilizes motion vector prediction (MVP) to code a motion vector (MV) associated with a block coded with coding modes including an affine motion mode, the apparatus comprising one or more electronic circuits or processors arranged to:

receive input data related to a current block at a video encoder side or a video bitstream corresponding to compressed data including the current block at a video decoder side;

determine a neighbouring block set of the current block comprising multiple spatial neighbouring blocks and one or more collocated blocks, wherein one MV (motion vector) associated with one collocated block is referred as one temporal MV;

derive one or more constructed affine MVP candidates for an affine MVP candidate list based on CP (control-point) MVs (motion vectors), the CP MVs being derived from said multiple spatial neighbouring blocks and said one or more collocated blocks, wherein one constructed affine MVP candidate derived without one temporal MV is checked and inserted into the affine MVP candidate list before any constructed affine MV with one temporal MV, wherein said one or more constructed affine MVP candidates are derived according to an order corresponding to {TL, TR, BL}→{TL, TR, Col}→{TL, BL, Col}→{TR, BL, Col}→{TL, TR}→{TL, BL}, wherein TL corresponds to a top-left MV, TR corresponds to a he top-right MV, BL corresponds to a bottom-left MV and Col corresponds to one temporal MV; and encode or decode the current block or motion information of the current block based on the affine MVP candidate list.

* * * * *